(12) United States Patent
Waanders et al.

(10) Patent No.: US 10,711,214 B2
(45) Date of Patent: Jul. 14, 2020

(54) PRODUCTION OF A CARBONACEOUS FEEDSTOCK MATERIAL FROM A WASTE CARBON SOURCE

(71) Applicant: NORTH-WEST UNIVERSITY, Potchefstroom (ZA)

(72) Inventors: Frans Boudewijn Waanders, Potchefstroom (ZA); Sanette Marx, Potchefstroom (ZA); John Reginald Bunt, Potchefstroom (ZA)

(73) Assignee: NORTH-WEST UNIVERSITY, Potchefstroom (ZA)

( * ) Notice: Subject to any disclaimer, the term of this patent is extended or adjusted under 35 U.S.C. 154(b) by 0 days.

(21) Appl. No.: 15/568,135

(22) PCT Filed: Feb. 8, 2016

(86) PCT No.: PCT/IB2016/050646
§ 371 (c)(1),
(2) Date: Oct. 20, 2017

(87) PCT Pub. No.: WO2016/170439
PCT Pub. Date: Oct. 27, 2016

(65) Prior Publication Data
US 2018/0119040 A1    May 3, 2018

(30) Foreign Application Priority Data
Apr. 22, 2015   (ZA) .................................. 2015/02744

(51) Int. Cl.
*C10L 10/02* (2006.01)
*C10L 5/04* (2006.01)
(Continued)

(52) U.S. Cl.
CPC ................. *C10L 10/02* (2013.01); *C10L 5/02* (2013.01); *C10L 5/361* (2013.01); *C10L 9/086* (2013.01);
(Continued)

(58) Field of Classification Search
CPC .... C10L 5/04; C10L 5/143; C10L 5/16; C10L 5/20; C10L 5/361; C10L 5/363;
(Continued)

(56) References Cited

U.S. PATENT DOCUMENTS 4,529,407 A * 7/1985 Johnston ................... C10L 5/14
                                                              44/542
5,916,826 A * 6/1999 White ....................... C10L 5/14
                                                              44/551
(Continued)

OTHER PUBLICATIONS

Piyo et al. Liquefaction of sunflower husks for biochar production. Masters Dissertation. North-West University. (Year: 2014).*
(Continued)

*Primary Examiner* — Latosha Hines
(74) *Attorney, Agent, or Firm* — Nath, Goldberg & Meyer; Joshua B. Goldberg; Daniel Bissing

(57) ABSTRACT

The production carbonaceous feedstock material from waste containing carbon sources and the use thereof in gasification processes for hazardous emissions of greenhouse gases and sulphur are significantly minimized and enhanced reaction rates are described. A process for producing a carbonaceous feedstock material from waste containing carbon sources, including the steps consisting of: (i) introducing a source of biochar to a source of discard coal fines to form a bio-coal mixture; (ii) introducing a catalyst additive selected from the group consisting of a source of an alkali metal or a source of an alkaline earth metal to the bio-coal mixture; (iii) optionally, contacting the bio-coal mixture with a binder; and (iv) compacting the resulting mixture of step (ii) or (iii)
(Continued)

to form one or more carbonaceous feedstock briquettes, the size of said briquettes having a dimension of at least 5 mm.

17 Claims, 9 Drawing Sheets

(51) Int. Cl.
    *C10L 5/36*     (2006.01)
    *C10L 9/08*     (2006.01)
    *C10L 9/10*     (2006.01)
    *C10L 5/02*     (2006.01)
    *C10L 5/44*     (2006.01)

(52) U.S. Cl.
    CPC . *C10L 9/10* (2013.01); *C10L 5/04* (2013.01); *C10L 5/447* (2013.01); *C10L 2200/0209* (2013.01); *C10L 2200/0213* (2013.01); *C10L 2230/04* (2013.01); *C10L 2250/06* (2013.01); *C10L 2290/04* (2013.01); *C10L 2290/28* (2013.01); *C10L 2290/30* (2013.01); *Y02E 50/10* (2013.01); *Y02E 50/30* (2013.01)

(58) Field of Classification Search
    CPC .. C10L 5/44; C10L 5/445; C10L 5/447; C10L 5/10; C10L 10/02; C10L 9/086; C10L 9/10; C10L 2200/0209; C10L 2200/0213; C10L 2250/06; C10L 2230/04; C10L 2290/30; C10L 2290/28; C10L 2290/04; Y02E 50/10; Y02E 50/30
    See application file for complete search history.

(56) References Cited

U.S. PATENT DOCUMENTS

| | | | |
|---|---|---|---|
| 2009/0217586 A1* | 9/2009 | Rappas | C10J 3/482 48/127.7 |
| 2011/0197501 A1* | 8/2011 | Taulbee | C10L 5/04 44/553 |
| 2013/0199920 A1* | 8/2013 | Demir | C10J 3/26 201/16 |

OTHER PUBLICATIONS

Piyo et al. Liquefaction of sunflower husks for biochar production. Masters Dissertation. 2014. North-West University (Year: 2014).*

* cited by examiner

PRODUCTION OF A CARBONACEOUS FEEDSTOCK MATERIAL FROM A WASTE CARBON SOURCE

This is a National Phase Application filed under 35 U.S.C. 371 as a national stage of PCT/IB2016/050646, filed Feb. 8, 2016, claiming the benefit from South African Application No. 2015/02744, filed Apr. 22, 2015, the content of each of which is hereby incorporated by reference in its entirety.

TECHNICAL FIELD

The present invention relates to a process for the production of a carbonaceous feedstock material from waste-containing carbon sources. The present invention further relates to the use of the carbonaceous feedstock material in gasification processes whereby hazardous emissions of greenhouse gases and sulphur are significantly minimized and reaction rates are greatly enhanced.

BACKGROUND TO THE INVENTION

The World Energy Outlook in 2011 estimated that the global energy needs will increase with 75% by 2035, and over 1 trillion US dollars is needed for large-scale investment for future energy supply in coal and biofuels (Statistics SA. 2011). The South African Government has also revised its own energy strategy so as to clarify government policy regarding the country's supply and consumption of energy for the foreseeable future. The South African Energy Policy White paper (the latest energy policy) advocates continuous deregulation, maintaining a coal resource database, promotion of low-smoke coals for households, promotion of end-use efficiency and clean-coal technologies, investigating the use of coal-bed methane, and the use of discard coal (White Energy Company. 2012).

Of the 255 Mt/a of coal produced in South Africa, 60 Mt/a of coal is discarded as fine deposits from mining and transport operations because of its perceived poor quality (high ash and sulphur) and volatiles diminish as stockpiles age (Wagner, N. J. 2008 and Bunt, J R et al. 1997). Coal is also discarded due to size, i.e. coal fines are generally classified as particles <500 microns that are separated from the coal during the beneficiation process (UNFCCC. 2001). In Coal-To-Liquid plants (CTL) as example, fixed-bed gasifiers use a lower cut size of 5 to 8 mm in the process for the production of liquid fuels, thereby delivering a higher percentage of "fine" coal, which is mainly used in the generation of high pressure steam (in pf combustion plants) for use in the gasification process (Ratafia-Brown, J. 2002). However, there is an overbalance of fine coal in the circuit, which inevitably leads to coal being discarded into storage ponds and slimes dams (EUBA. 2007).

Due to the importance of coal as a non-renewable resource these coal fines can be utilised. Discard coal having a heating value of c.a. 16 MJ/kg can be burnt by Eskom, making it a viable energy source; can be beneficiated and added back to a washed coarser product where contracts allow; or could be gasified in fluidised-bed and entrained flow reactors, but these technologies are extremely capital expensive and to date have not been implemented in South Africa (Radloff, B et al. 2004 and Hippo, E. J., et al. 1986). The Highveld coalfields are of great importance to the long-term life of Sasol's Synthetic Fuels (SSF) Division, but these coalfields are close to exhaustion, with an estimated remaining recoverable coal reserve of 9 billion tans (Sharma A, et al. 2008). Utilisation of discarded Highveld fines as example will assist in increasing the coal reserves available to Sasol, and will also be aligned with Government policy. An alternative process should therefore be found to enable coal to be used more effectively, thereby improving the life span of coal resources for future generations (UNFCCC. 2001).

Agglomeration of fine coal can be classified into briquetting and pelletizing, either with or without binders. Pellets are normally cylindrical with a diameter ranging from 6 to 12 mm and a length of 4 to 5 times the diameter. Briquettes can also be cylindrical with a diameter of 80 to 90 mm, or parallel-piped with average dimensions of 150×70×60 mm (Eakman, J. M. 1980). Briquetting with a binder has shown success in Australia (Wallerawang Colliery) where 70 kt/yr. of 50 mm diameter briquettes (10-20% moisture content) is produced by a double roller press for the production of fuel for use in a conventional power station using fine coal washery rejects. The binder used in this process is however unknown (Nel, S. 2013).

From a South African context, a process was developed by Mangena and de Korte (Suzuki, T. 1984) to transform discarded South African ultra-fine coal into valuable low-smoke fuel, which may be supplied to the domestic market at a price similar to that of coal. It was concluded that if it was accepted by the end-users, this fuel could help to reduce the amount of localised air pollution in households, particularly in the impoverished townships. Mangena & du Cann (Takaranda, T. 1986) also studied pillow-shaped binderless briquettes produced with a Komarek B-100A roll-type briquetting process using South African coal. This machine has a roll diameter of 130 mm and a maximum allowable pressure of 17 MPa. The briquettes produced had the following measurements: 40 mm (length)×19 mm (breadth)×13 mm (thickness). Their study concluded that briquetting with fresh, vitrinite-rich coking and blend coking coals were the most successful. Other alternatives should however be tested because of the effect that weathering had on the amenability of coal to binderless briquetting. The negative influence could be caused by the kaolinite content in the weathered coal. Binderless briquetting is however a possible utilization option for discard coal (Takaranda, T. 1986).

The Sasol-Lurgi fixed-bed dry-bottom gasification process, as deployed in the Sasol Synfuels plant in Secunda, South Africa, consumes more than 30 million tons of coal per annum. This coal is used for gasification in the 84 gasifiers in the plant, which produces more than 150 000 barrels per day of oil equivalent of fuels and chemicals. The feed to the Sasol-Lurgi gasifiers consists mainly of coarse (>6 mm) low-rank bituminous coal and extraneous rock fragments (usually carbonaceous shale, siltstone, sandstone, and mudstone). This feedstock is processed in the gasifiers at elevated temperatures (up to 1350° C.) and pressures less than 30 bar to produce synthesis gas (also referred to as syngas), which is a mixture of carbon monoxide and hydrogen. Coal gasification ash is a major by-product of the gasification process. This ash, referred to as "coarse ash", is a combination of red and white to grey sintered clinkers with heterogeneous texture varying from fine material to large irregularly shaped aggregates of sizes ranging from 4 to 75 mm. During the Sasol-Lurgi gasification process, the coal is gasified in counter-current mode to the gasification agent, i.e. steam and oxygen at an inlet temperature of approximately 350° C. The coal enters the gasifier through the automatically operated coal lock on top of the gasifier and is gasified by the steam and oxygen that are introduced at the bottom of the gasifier while gravitating down the moving bed. The coal is exposed to the different reaction zones in the gasifier, i.e. the drying and the pyrolysis zone where drying and devolatilization takes place. After this zone, the char enters the gasification zone where different gasification reactions take place. The gasification zone is followed by the combustion zone where the combustion of the char is affected in the presence of oxygen. The ash zone is the last zone where the ash is cooled down by the excess steam and oxygen that is fed in at the bottom of the gasifier. Sulphur is introduced to the Sasol-Lurgi gasification plant with the coal, where it is bonded either in the organic matter or mineral matter of the coal (Skhonde, P. 2009).

Sulphur in coal is derived primarily from two sources: original plant materials and inorganic materials in the coal-forming environment. Abundance of sulphur in coal is controlled by the depositional environment and the digenetic history of the coal seams and overlying strata. The seawater interaction with peat results in elevated levels of sulphur in coals. The sulphur in low-sulphur coals is derived only from plant materials. The amount and forms of sulphur vary among different coals due to the differences in the coal formation processes and the ranks of coal. South African coals that are used for the Sasol-Lurgi gasification process are normally low-grade medium rank C (bituminous) coal with a total sulphur content of approximately 1-2 weight percentage (wt. %), on an as-received basis. This value of the sulphur content is very low compared to some of the coals that are used worldwide for combustion and other processes. In a Ph.D. thesis by Benson (Benson, S. A. Ph.D. Thesis, 1987) some of the coals used for combustion from the San Juan Basin-Range and from the Powder River Region Range have a sulphur content of up to 3.5 wt. %. Most of the coals in the Illinois basin are known to be high-sulphur coals, with sulphur contents of more than 3 wt. %, which limits its use as a fuel source. Inorganic forms of sulphur (mainly pyrite) are usually the predominant forms of sulphur present in the South African coals used in the Sasol Synfuels plant in Secunda. There is also organically associated sulphur that is found within the organic moiety. Trace amounts of sulphur occur as sulphate sulphur on the coal surface.

When reflecting on the fate of sulphur in a typical fixed bed gasification circuit (such as at Sasol), the sulphur is present in the coal on route to the coal preparation plant, where a suitable particle size distribution of the feed coal delivered to the gasification plant is prepared. From the coal preparation plant, the fine coal (<6 mm) is transported to the steam plant and the coarser material (>6 mm) fed to gasification. In the gasifier, the sulphur contained in the coal is exposed to different temperatures as it passes through the various reaction zones. The gaseous sulphur enters the raw gas as $H_2S$ (since the top half of the gasifier operates under reducing conditions, and the bottom half under oxidizing conditions), and the $H_2S$ is transported through the gas clean-up and gas cooling processes. The $H_2S$ is then stripped from the raw gas at Rectisol and sent to the elemental sulphur recovery plant for saleable sulphur product production. Small amounts of the sulphur end up in the gasifier ash where it is trapped in the mineral matter in the ash. Essentially, 99% of the sulphur entering the gasifier reports to the gas phase as $H_2S$ during fixed-bed gasification (Skhonde, P. 2009).

The United States (as example) has large reserves of high-sulphur, caking Eastern bituminous coal. Because of the restrictive environmental emission requirement, this coal cannot be used directly for generation of power, unless the station is equipped with sulphur dioxide scrubbers, which raises the cost of power. One approach to meet the environmental emission requirement and to maintain or improve the overall power generation efficiency is the development of hot gas clean-up systems to remove sulphur and particulate contaminants from the fuel gas, thereby eliminating the efficiency losses associated with the cold gas clean-up methods such as wet scrubbing. Simplicity, efficiency, and cost containment are all integral parts of the development of the sulphur removal systems. An attractive system for coal gasification is one in which high-sulphur coal is gasified; sulphur in the coal is retained within the gasifier with ash, eliminating the need for gas clean-up; gas is available for use without first cooling it to preserve the sensible energy; and water vapour is retained in the product gas to make a substantial contribution in the combined-cycle power output. These criteria can be met through the use of a calcium-based sorbent such as limestone or dolomite directly in the fluidized-bed gasifier, which acts as both a catalyst for the gasification reactions and captures sulphur as calcium sulphate (Abbasian, J. 1990).

The Institute of Gas Technology (IGT) has already developed the U-GAS Process to produce fuel gas from coal. The U-GAS process uses a single-stage fluidized-bed reactor to efficiently convert any type of coal, either run-of-mine or washed, into low- or medium-Btu fuel gas that can be used in industrial plants or utility power plants (Abbasian, J. 1990). The process has been developed during 10 years of testing in a 30 tons of coal per day capacity pilot plant located in Chicago and is currently being commercialized. In a new configuration of the U-GAS process, the U-GAS One-Step Desulfurization Process, limestone or dolomite is fed into the coal gasifier to capture and remove sulphur compounds from the fuel gas within the gasifier. Under the reducing conditions of the gasifier, limestone reacts with sulphur compounds to significantly reduce the sulphur content of the fuel gas. Researchers in the field of chemical kinetics of limestone/dolomite reactions with hydrogen sulphide (Rehmat, A et al. 1987; Chang, E et al. 1984; Keairns, D et al. 1976; Borgwardt, R et al. 1984; Pell, M. 1971; Squires, A et al. 1971; Freund, M. 1984; Ruth, L et al. 1972; Kamath, V et al. 1981; Roache, N. 1984 and Abbasian, M et al. 1990) have already verified the potential use of these sorbents for sulphur capture. The reaction of calcined limestone/dolomite is very rapid, and the reaction almost approaches equilibrium. On that basis, it is possible to capture substantial quantities of sulphur and discharge it with the ash (Jones, F. L et al. 1985). Based on equilibrium considerations, it is feasible to remove up to 90% sulphur using this process. No work has been conducted (as far as the Applicant is aware) of in-situ sulphur capturing in a fixed-bed gasifier operating on lump coal particles (>10 mm-100 mm).

Much lab research has been conducted in the field of catalytic gasification, where small coal particles (<1 mm) are gasified ($CO_2$, $H_2O$) in the presence of alkali metals, and have shown that gasification reactivity can be significantly enhanced at temperatures ranging from 800-1000° C. Exxon Research and Engineering Company developed a catalytic coal gasification (CCG) process in the 1970's (More, P et al. 2012). The pilot plant operated at 700° C. and 34 bar, with a 1 ton/day coal throughput. An average particle size of 2.4 mm was used, with a catalyst loading of $K_2CO_3$ of between 10-20 wt. %. The coal was fed to a catalyst mixer, where an aqueous catalyst solution was added to the coal. The impregnated coal was dried with an air/flue gas mixture, after which it was fed to a fluidised bed gasifier. More recent research by Nel et. al., (Nel S et al. 2013)] has also shown that the addition of an impregnated $K_2CO_3$ catalyst (1% loading) to 10 mm coal particles of R.O.M. Highveld coal lowered the activation energy during reactivity testing when compared to raw coal (Rehmat, A et al. 1987). The challenge remains to increase the catalyst loading to large coal particles. Botha (Botha, A. 2012) successfully demonstrated that the addition of a catalyst (1%, 3%, 5% $K_2CO_3$ addition) can be incorporated into a discard Highveld fine coal agglomerate mixture (10 mm pellet) by physical mixing in order to improve $CO_2$ gasification reactivity measured at high temperatures (900-1000° C.). It was concluded that the $CO_2$ gasification reactivity could at least be doubled in this catalysed system when compared to raw coal.

Coal utilisation has also led to rising concerns about $CO_2$ emissions causing global warming. The use of biomass is considered to be renewable and assists in reducing $CO_2$ emissions compared with coal, because biomass is suggested to be $CO_2$ neutral with regard to the greenhouse gas balance (Uson, S et al. 2004; Zhu, W et al. 2008; Biagini, E et al. 2002 and Bonobe, T et al. 2008). The gasification of fuels often occurs primarily through two overlapping stages: pyrolysis and conversion of the char residue (Ciferno, J. P et al 2002). The knowledge of pyrolysis characteristics could be important for understanding better thermochemical conversion of biomass (Yang H, et al. 2007). One of the important features of biomass is the high content of alkali metal in some of the biomass material. Alkali metals, such as potassium, are found to reduce the coal's ash melting point and they are considered to influence the thermochemical conversion processes (Keown, D. M et al. 2005). The biomass metal salts retained after charring could be used as a cheap catalyst during the co-processing of coal (Raveendran, K et al. 1998 and Zolin, A et al. 2001)). Keown et al. stated that these metal salts tend to volatilise during pyrolysis. However, studies done by Nielsen et al. (Nielsen, H. P et al. 200) showed that the volatilisation of these metal salt species from biomass may also cause problems during thermochemical conversion (e.g. slagging and fouling). Currently, particular interest is shown in co-utilization of coal and biomass to produce synthesis gas via the gasification process. The continuous supply of biomass can be challenging if biomass were used alone for thermochemical processes. For instance, poor weather conditions may affect biomass crop supply, storage of biomass (prevention from degradation), grindability, and costs to deliver the crops could increase depending on how far it is from the biomass power plants (Collot, A. G et al. 1999). Coal and biomass can be co-utilised in such a way as to optimize the gas production during thermal treatment.

Thermochemical conversion can be carried out at high temperatures in order to reduce tar formation, and improve the quality and quantity of the product gas formed (Kumabe, K et al. 2007). The resulting synthesis gas is a combination of carbon monoxide (CO), carbon dioxide ($CO_2$), hydrogen ($H_2$), carbonyl sulphide (COS), water ($H_2O$), methane ($CH_4$), nitrogen ($N_2$), higher hydrocarbons ($C2^+$), hydrogen sulphide ($H_2S$), hydrogen cyanide (HCN) and other low molecular mass products. There is limited research being performed to take full advantage of the catalytic properties of inherent alkaline compounds in biomass during the co-pyrolysis process. Most existing studies focus on fast pyrolysis of biomass to produce bio-oil, possible synergetic effects that rise from coal/biomass use during co-gasification, and increasing char reactivity (Moghtaderi, B et al. 2004; Kumabe, K et al. 2007 and De Jong, W et al. 1999). A comprehensive understanding of gaseous products formed during pyrolysis due to co-utilisation is required. The study of thermal treatment of coal, biomass, and coal-biomass blends could provide important information on how to elucidate industrial problems such as clogging of filters, catalyst poisoning, hot-corrosion, erosion, and gas emissions (Gray, D et al. 1996)

The gasification and co-gasification of different types of biomass has been extensively investigated (Tremel, A et al. 2012; Xie, Q et al. 2014; Kaewpanha, M et al. 2014 and Yang, K et al. 2013). The main components of biomass are cellulose, hemicellulose, lignin, extractives, water and mineral matter (alkali and alkali earth metals) (Pereira, H. 1998)). The composition of the biomass used has a significant and direct influence on product distribution from pyrolysis and gasification (Lv, D et al. 2010). Cellulose is associated with fast pyrolysis rates while lignin is said to slow down pyrolysis. Song and co-workers (Song, Y et al. 2013) showed that the addition of biomass to coal enabled the lowering of the gasification temperature while still maintaining the required $H_2/CO$ ratio.

One of the main drawbacks of biomass gasification and co-gasification with coal is the formation of heavy tars (Anis, S et al. 2011; Li, X et al. 2009 and Torres, W et al. 2007). Some biomass feedstock with high ash content can cause problems in existing gasifiers due to relatively low ash melting temperatures, high alkali concentrations ($Na_2O$ and $K_2O$) and the tendency for slagging, fouling and agglomeration (Yadav, V et al. 2013) that has a negative impact on gasification efficiencies. Pyrolysis and/or gasification of biomass require a high heating rate, and thus pulverisation of the biomass to small particle sizes is required.

Carbonization (also referred to as torrefaction or liquefaction) is a mild thermochemical treatment (200-400° C.) that removes moisture and organic acids from the biomass producing a coal like substance as solid product as well as bio-oil and biogas. The main aim of liquefaction is to reduce a material of low density and energy value into a stable product with high energy density and carbon content ready for use in combustion and gasification processes (Chen, P et al. 2009 and Bridgman, T. G et al. 2008). Liquefaction has the highest net energy gain for biomass conversion to solid, liquid and gas products compared to pyrolysis and gasification (Khoo, H. H et al. 2013).

There is a gap in the literature regarding the combustion and gasification properties of biochar. However, biochar requires less energy for size reduction, has an improved O/C ratio compared to biomass and increases the $H_2$, $CH_4$ and CO content of the gas phase during pyrolysis while lowering the formation of $CO_2$ (Ren, S et al. 2013). Biochar produced through liquefaction from agricultural waste such as sunflower husks (Piyo, N. 2014) was shown to have approximately half the ash content of fine coal (20-30%) Song and co-workers (Song, Y et al. 2013) found that dry gas yield, cold gas efficiency and carbon conversion efficiency increased with an increase in torrefied biomass to coal ratio during gasification.

Biomass material contains significantly higher amounts of alkali (Na and K) and alkali earth (Ca and Mg) metals (AAEM) than most fossil fuels utilised in pyrolysis and gasification (Jiang, L et al. 2012). Raveendan et al. 1995 showed that AAEM present in biomass ash has a significant influence on the pyrolysis characteristics and product distribution during biomass pyrolysis and gasification. Although high concentrations of AAEM in biomass are associated with increased slagging and agglomeration (Knudsen, J. N et al. 2004 and Xiang, F et al. 2012) during biomass gasification, it is also associated with increased reactivity (Duman, G et al. 2014 and Memanova, V et al. 2014). AAEM is said to have a catalytic effect due to interactions with cellulose and the lignin component in the biomass that effect the decarboxylation, decarbonylation and de-esterification reactions taking place during pyrolysis leading to increased CO and $CO_2$ formation at temperatures above 400° C.

Kaewpanha et al. 2014 also showed that alkali earth metals in biomass can increase $H_2$ and $CO_2$ content in the product gas from gasification. Generally, the presence of AAEM in biomass increases char and gas yield while decreasing bio-oil yield (Aho, A et al. 2013). Large amounts of AAEM (50-70%) are lost to the gas phase during pyrolysis above 400° C. and at high heating rates (>10 K·min$^{-1}$), thus producing chars with reduced amounts of AAEM during gasification, and thus a reduced influence on reactivity. Treatment temperatures during liquefaction are sufficiently low to retain AAEM in the biomass in the biochar (Xue, G et al. 2014)

Whilst Highveld fine discard coal beneficiation has been studied in the past, it has never been implemented for particles <212 micron (EUBA. 2007).

There is thus a clear need in the art to explore the agglomeration of fine discard coal for use in applications, such as fixed bed gasification technologies, thereby affording a reduction in sulphur emissions and other gaseous pollutants concomitant with increased reactivity rates in a manner that overcomes or at least mitigates the shortcomings associated with the prior art.

Furthermore, the current invention provides a solution within the existing gasification island to assist companies in avoiding the need to integrate highly capital-intensive fine coal gasification technologies with clean up infrastructure.

SUMMARY OF THE INVENTION

According to a first aspect thereof, there is provided a process for producing a carbonaceous feedstock material from waste containing carbon sources, the process including the steps consisting of:
(i) introducing a source of biochar to a source of discard coal fines to form a bio-coal mixture;
(ii) introducing a catalyst additive selected from the group consisting of a source of an alkali metal or a source of an alkaline earth metal to the bio-coal mixture;
(iii) optionally, contacting the bio-coal mixture with a binder; and
(iv) compacting the resulting mixture of step (ii) or (iii) to form one or more carbonaceous feedstock briquettes, the size of said briquettes having a dimension of at least 5 mm.

In terms of the present invention, the resulting carbonaceous feedstock briquettes are employed in gasification processes, in particular, fixed-bed gasifiers as discussed in more detail herein below.

In an embodiment of the invention, the source of discard coal fines may be derived from fines produced during mining and crushing at the mine site or during coal cleaning operations at a coal-preparation plant. Preferably, the source of discard coal fines is selected from the group consisting of de-watered, filter cake, discard stockpile, slimes dam or mixtures thereof. This material is generally too fine and too wet to be used for any other feasible applications and thus provides a cheap and readily available starting material.

It is to be appreciated that current, conventional catalytic gasification processes have only focussed on powdered coal and not on discard coal fines of the type identified herein. Once again, a clear emphasis needs to be placed that this invention relates to discarded coal fines being generally too fine and too wet to be used for any other feasible applications and not powdered coal usually having a diameter larger than 212 μm and thus having a primary application and/or usage in gasification processes, as known at the priority date of this application.

In a preferred embodiment, the discard coal particle size may be less than 212 μm.

The source of biochar is prepared from a combination of lignocellulosic biomass and liquid (such as water, alcohols or other organic solvents) in a standard liquefaction high pressure reactor and dried to form a dried source of biochar.

The lignocellulosic biomass is preferably rich in lignin matter, such as any agricultural waste material, lignocellulosic waste material from fermentation processes, waste material from sugar processing industries, wood residues, grasses and other organic material. Lignocellulose consists of cellulose molecules, hemicellulose molecules and lignin molecules. Each of these is a complex polymer and each species of plants has a unique composition of the three polymers.

In one embodiment of the invention, green or dried raw biomass may be used. Suitable biomass materials useful in the present invention include, but are not limited to, sweet sorghum bagasse, amaranth stalks and stems, sunflower husks, sawdust, weeds, lignosulfonate, sludge, extracted molasses, or a mixture thereof. In a preferred embodiment of the invention, the biomass consists of sweet sorghum bagasse, amaranth stalks and stems, sunflower husks, or a mixture thereof.

In an embodiment of the invention, the ratio of discard coal fines to biochar could vary between 0 and 100. In a preferred embodiment of the invention the ratio may comprise of any one of 75:25, 50:50 and 25:75.

According to the invention, a catalyst additive in the form of a source of an alkali metal or a source of an alkaline earth metal is added to the bio-coal mixture to enhance the reactivity. The source of the alkali metal or the alkaline earth metal may be selected from potassium (K), sodium (Na), magnesium (Mg), calcium (Ca), or any other suitable alkali or alkaline earth metal. Examples thereof include, but are not limited to $K_2CO_3$, $Na_2CO_3$, $Ca(OH)_2$, and $CaCO_3$. In one of the preferred embodiments of the invention, the catalyst additive is $K_2CO_3$. As mentioned herein before, alkali metals such as potassium and sodium help to reduce the melting point of the coal fines, therefore lowering the temperature (and thus the energy) needed for gasification.

In yet another embodiment of the invention, the catalyst additive may be $CaCO_3$. The $CaCO_3$ may further comprise between 1 wt % and 5 wt % of the concentration of the carbonaceous feedstock material as produced in the process as described herein above. In yet another preferred embodiment of the invention, the wt % of the concentration of the carbonaceous feedstock material may be 3%. The $CaCO_3$ may be inherent to the coal source.

The amount of catalyst additive added may be 0-100 g kg$^{-1}$, preferably 50 g kg$^{-1}$.

Where appropriate, an optional binder may be added to and mixed with the bio-coal mixture. Suitable binders include, but are not limited to, lignin, a lignin and asphalt emulsion, wheat starch, lignosulfonate, tall oil, coal tar, polyvinyl alcohol, phenolic resin, paper sludge, a molasses and lime mixture, gaur gum, polymer material, plastics or mixtures thereof.

The amount of binder added may be between 1 and 5 wt %, preferably 1 wt %.

The term briquette is intended to cover the compacted articles of the invention regardless of their shape and regardless of the method of compacting. As used in the specification, and unless otherwise indicated, the term briquettes include extrusions, pellets, and other shapes which have been subjected to the requisite compacting.

Any suitable and standard briquetting machine may be used to compact the bio-coal mixture into one or more carbonaceous feedstock briquettes having a dimension of between at least 5 mm up to 100 mm. Examples of suitable briquetting machines include the Komarek B050A and the Komarek B050 machines.

The shape of the extrusions, briquettes, or pellets may be circular or polygonal (either regular or irregular) in cross-section and may vary in diameter.

In a preferred embodiment of the invention, the carbonaceous feedstock briquettes have a dimension of 10 mm, more preferably 20 mm.

In an embodiment of the invention, water may be added in order to encourage briquette nucleation. The moisture content of the carbonaceous material, lignocellulosic biomass and optional binder being processed into the briquettes is in the order of between 10% and 30%.

According to the invention, the carbonaceous feedstock material produced according to the present invention significantly minimizes hazardous emissions of greenhouse gases and sulphur and also enhances the reaction rate when utilized in gasification technologies.

The process of the present invention allows one to convert waste/discard coal fines and biomass into a valuable energy resource on a meaningful scale.

In accordance with a second aspect of the invention, there is provided the use of the carbonaceous feedstock material, prepared in accordance with the process set out herein above, in gasification processes.

In a preferred embodiment of the invention, the carbonaceous feedstock material is used for gasification in fixed bed gasifiers, in particular dry-bottom Lurgi gasification (non-slagging reactors).

It is to be appreciated that conventional fluidized bed gasifiers operate using coal having a maximum particle size of 8 mm. The present invention thus affords a surprising and non-obvious contribution to the art since the invention pertains to carbonaceous feedstock material that possesses greater dimensions to the coal particles currently used in conventional fluidized bed gasifiers, namely dimensions ranging from between at least 5 mm to 100 mm, which dimensions clearly fall outside the operating capability of fluidized bed gasifiers.

It will be appreciated that Lurgi gasifiers are designed to operate above the initial deformation temperature of coal; i.e. >1250° C. in the case of bituminous coals. Operating at lower temperatures are, however, necessary in a catalysed system, since the added alkali compounds act as fluxing agents, thus lowering the ash fusion temperature thereby leading to excessive slagging which is unwanted in a dry-bottom non-slagging gasification technology. Thus, according to a more preferred embodiment of the invention, the carbonaceous feedstock material is used in dry-bottom Lurgi gasification (non-slagging 4 m diameter) reactors operating in catalytic gasification mode (i.e. 1000° C.).

A vast number of companies are currently undergoing extensive research in an attempt to optimise their gas cleanup circuit so as to conform to the sulphur emission targets set by legislation. Whilst elemental sulphur is produced as a by-product and sulpuric acid plants are being investigated, these are mitigation endeavours which are highly capital intensive. Accordingly, the Inventors believe that in-situ hot gas cleanup in the Lurgi gasifiers will significantly decrease the sulphur gaseous emission into the raw gas stream which needs to be post conversion cleaned.

In an embodiment of the invention, protection for sought the briquettes as obtained from the process described herein above.

These and other objects, features and advantages of the invention will become apparent to those skilled in the art in the following detailed description of the invention.

BRIEF DESCRIPTION OF THE TABLES

Table 1: shows proximate analysis results (air dried basis) for the discard coal and bio-char;
Table 2: shows kinetic parameters for certain samples;
Table 3: depicts ultimate analysis of biomass, biomass char, coal and coal char (air-dried basis %); and Table 4: shows sulphur retention as a function of reaction temperature for the 5 cases as provided in the experimental examples 1 and 2.

The presently disclosed subject matter will now be described more fully hereinafter with reference to the accompanying examples, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

DETAILED DESCRIPTION OF THE INVENTION

The invention was performed in accordance with the following steps.

Pellet Preparation

Figure 1:
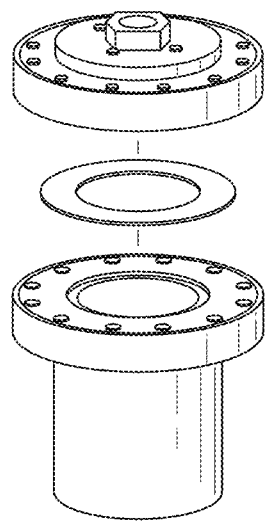
FIG. 1: is a three-dimensional representation of a standard high pressure autoclave.

Biochar was prepared from lignocellulosic biomass (e.g. sweet sorghum bagasse, amaranth stalks and stems. sunflower husks) in a standard (Sawayama, S et al. 1995; Yang, Y. F et al. 2004; Sote, Y et al. 1994 and Dote, Y et al. 1996) liquefaction high pressure reactor (see FIGS. 1 and 2).

Figure 2:
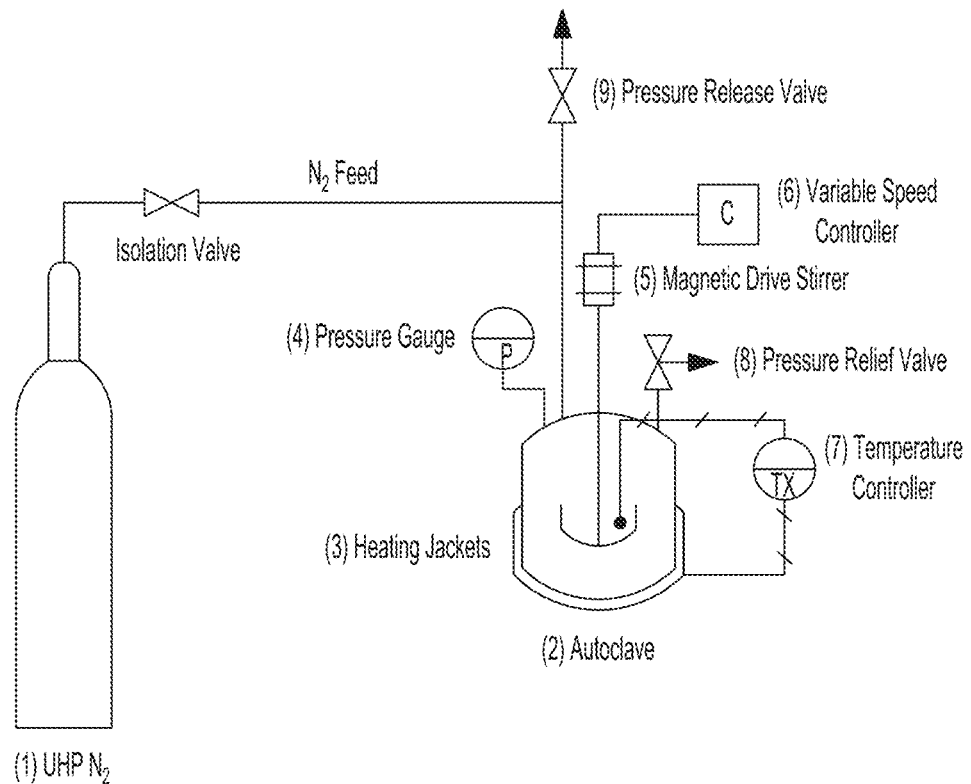
FIG. 2: is a schematic representation of the experimental setup.

With reference to FIG. 2, the autoclave (2) was charged with a fixed amount of biomass and liquid. The removable top plate of the autoclave was fastened in place and the residual air was purged from the autoclave by ultra-high purity (UHP) nitrogen (1) for 10 minutes. The pressure release valve (9) and isolation valve (11) were closed before liquefaction was started.

The temperature of the autoclave was increased up to the required operating temperature by the heating jackets (3) (one for the main body of the autoclave and another for the end plate of the autoclave) which is controlled by temperature controllers (7). The reaction temperature was held constant for the duration of the chosen reaction time and the heating time of the autoclave was kept constant at 2 hours. At the initiation of heating, the magnetic drive stirrer (5) was switched on and set to 750 rpm by the variable speed controller (6). The pressure in the autoclave was obtained by the vaporization of the liquid according to the vapour-liquid equilibrium and was therefore dependent on the reaction temperature. The pressure inside the autoclave was measured with a pressure gauge (4). A pressure relief valve (8) was also fitted to the autoclave to ensure that the pressure of the autoclave stayed within the design limits.

After the completion of liquefaction, the heating jackets (3) were removed from the autoclave (2) and the autoclave was allowed to cool down to room temperature. The pressure release valve (9) was opened to release the pressure in the autoclave (2), which built up due to gas formation. A solvent (e.g. chloroform) was added to the reaction mixture after it had cooled down to room temperature and stirred inside the autoclave for 10 minutes to ensure that any oil and char residue that may be fixed to the inside of the autoclave was dissolved. The mixture was then filtered under a vacuum with Whatman No. 31 filter paper to collect any solid residue. The bio-oil was recovered from the filtrate through decantation and solvent evaporation. Biochar, bio-oil and gas samples were collected and analysed to close the mass balance for the biomass used.

The produced biochar was washed with solvent to remove any residual oils and was then dried overnight in an oven at 105° C.

Dried biochar was mixed with discard coal fines to produce mixtures containing different weight fractions of biochar to coal. The mixtures were then briquetted using a standard briquetting machine to produce bio-coal samples with dimensions of at least 5 mm and larger so as to be suitable for utilisation in fixed-bed gasification for example. An alkali metal or alkaline earth metal was also added to the bio-coal mixture in varying proportions so as to act as a reactivity enhancer, but also so as to effect hot gas sulphur scrubbing during utilisation. In the preparation, binders may also be considered if necessary.

Gaseous Sulphur Reduction in a Fixed-Bed Gasifier

In order to demonstrate an example of the gaseous sulphur reduction possible with the use of the coal feedstock prepared in accordance with the present invention, a simulation of the fixed-bed gasification process was conducted to show the partitioning and speciation behaviour of the inorganic sulphur chemistry occurring.

The thermochemical simulation package used was Fact-Sage 6.3 which is used extensively to study high temperature inorganic mineral thermodynamic chemistry. The simulation input data was derived from the analysis (proximate, ultimate, elemental ash analysis) of a typical Highveld seam 4 coal from Secunda.

The model input was as follows: carbon (73.76 g), nitrogen (1.99 g), oxygen (11.84 g), hydrogen (4.40 g), $Al_2O_3$ (2.05 g), CaO (0.93 g), $Cr_2O_3$ (0.01 g), $Fe_2O_3$ (0.78 g), $K_2O$ (0.05 g), MgO (0.30 g), MnO (0.009 g), $Na_2O$ (0.05 g), $SiO_2$ (2.91 g), $TiO_2$ (0.14 g), $V_2O_5$ (0.006 g), $ZrO_2$ (0.01 g), Ba (0.04 g), Sulphur was introduced as $FeS_2$ (1%). In order to simulate the gasification process, hydrogen gas was introduced in excess (100 g) in order to ensure that the chemical system was under strictly reducing conditions. Dolomite $[Ca/Mg (CO_3)_2]$ (10 g) was added to the system to investigate the possibility of sulphur capturing and retention, and was compared to a base case simulation with no dolomite present. Since catalytic gasification is proposed to operate at temperatures of 1000° C. (max.), the simulation considered the temperature range 25° C. up to 1025° C., in steps of 100° C. The simulation also considered the effect of gasifier pressure which was fixed at 28 bar. The Fact-Sage distribution function was used to disseminate the sulphur species behaviour once the simulation was completed.

Figure 3:
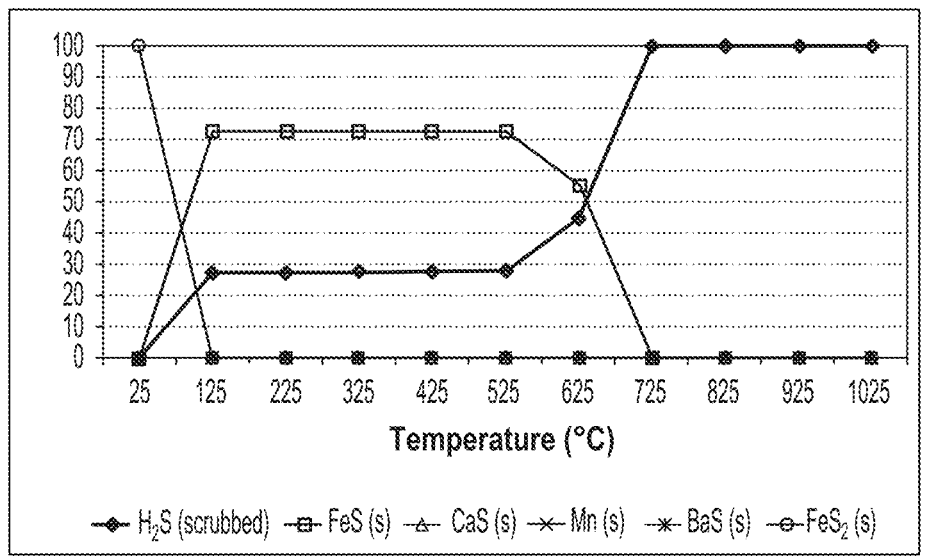
FIG. 3: is a graph depicting fixed-bed gasifier simulation showing the speciation behaviour of sulphur in a reducing environment (25 to 1025° C.)

FIG. 3 shows the base case model output results (reaction temperature versus sulphur species fractional % distribution). It can be observed that in this highly reducing atmosphere, pyrite decomposes at 125° C. forming pyrhotite (FeS) with a release of $H_2S$ gas according to the reaction $FeS_2 + H_2 = Fe_{(1-x)}S + H_2S$ (1). FeS is shown to be stable up to a temperature of 525° C., where after it decomposes, and is not present above 725° C. At this point, all of the sulphur (in the form of $H_2S$) is present in the gas phase, in agreement with the Sasol process (Skhonde, P et al. 2009).

Figure 4:
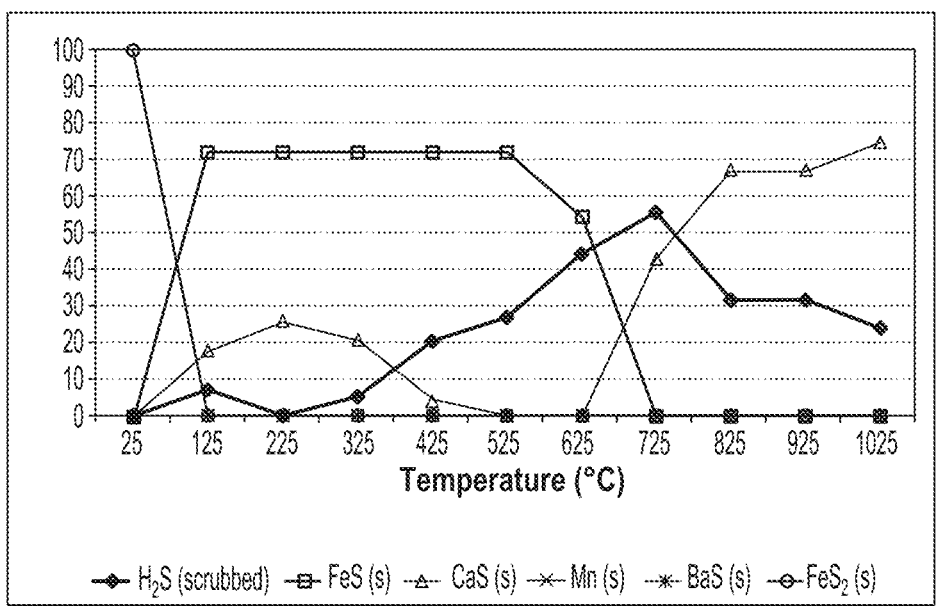
FIG. 4: is a graph depicting fixed-bed gasifier simulation showing the speciation behaviour of sulphur in a reducing environment when dolomite is present in the system (25 to 1025° C.)

FIG. 4 shows the simulation output for the dolomite added scenario under reducing conditions. It can be observed that the speciation of $FeS_2$ and FeS occurs in an identical fashion as for the base case run, but, the formation of a calcium sulphide (CaS) solid species is now also evident. According to authors Abbasain et al., (Abbasain, J et al. 1990), this species starts forming in the process, and the primary sulfidation reactions take place within the fluidized-bed gasifier under reducing conditions. The limestone is calcined at gasification conditions and sulphur capture occurs through the reaction of calcium oxide with hydrogen sulphide:

$$CaCO_3/MgCO_3 = CaO/MgO + 2CO_2 \qquad (1)$$

$$CaO/MgO + H_2S = CaS + MgO + H_2O \qquad (2)$$

The simulation in FIG. 4 shows that a CaS (s1) phase is possible at temperatures ranging between 125° C. and 425° C. When the FeS solid species has finally decomposed and the dolomite has been calcined at 625° C. (reaction 1), a CaS (s2) transition state product is formed (reaction 2), and a clear reduction in gaseous $H_2S$ is evident.

At 1025° C., the fractional $H_2S$ distribution has been reduced to 24%, with the CaS (solid reaction product) accounting for the remaining 76%. This result is in fair agreement with results reported by Abbasin et al., who claimed a 90% sulphur removal of sulphur in the form of CaS during fluidized bed gasification studies.

It should be noted that fluidized-bed gasifiers operate using coal with a maximum particle size of 8 mm. The present invention thus opens the door to gasifiers using larger particle sizes (fixed-bed gasifiers) because the size can be controlled and can range between 100 mm and 10 mm which is outside the operating capability of fluidized bed gasifiers.

Figure 5:
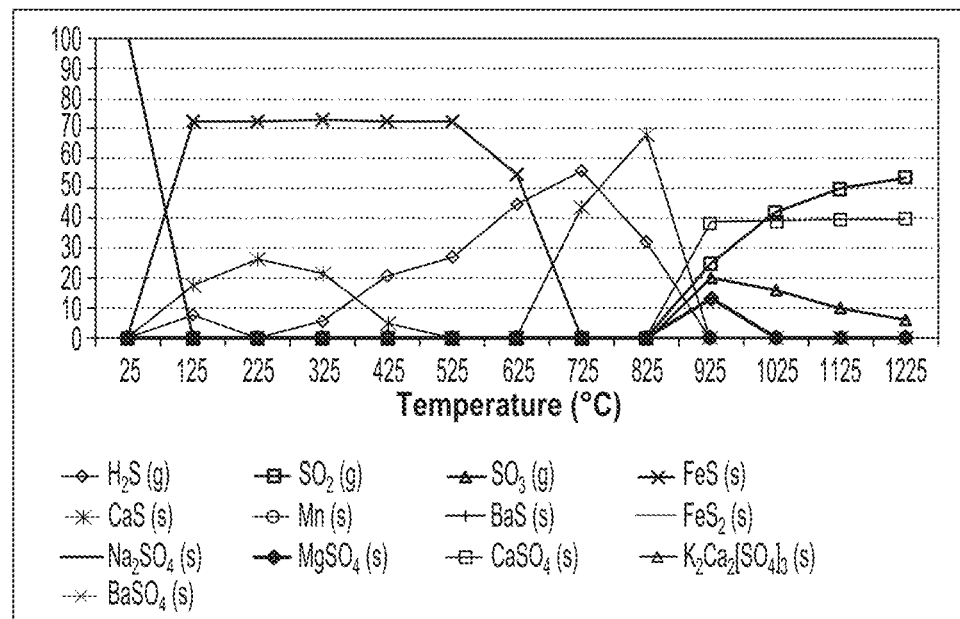
FIG. 5: is a graph depicting fixed-bed gasifier simulation showing the speciation behaviour of sulphur in a reducing and oxidizing environment when dolomite is present in the system (25 to 1225° C.)

However, the CaS product formed under reducing conditions (as shown by the simulation) is water soluble and cannot therefore be disposed of in the ash product exiting the gasifier. It is known that CaS reacts with water to form $H_2S$ in solution and $Ca(OH)_2$ (Tremel, A et al. 2012). Fortunately, oxidizing conditions are also needed during the fixed-bed gasification process, and FIG. 5 shows the simulation result when reacting the CaS and $H_2S$ products formed (shown in FIG. 4) with oxygen (FIG. 5). The input data for this simulation was taken as the model output as given at a temperature of 825° C. because the catalytic gasification process needs to run at temperatures below 1000° C. In this case, the CaS and $H_2S$ distributions were c.a. 70% and 30% respectively. The simulation input data was as follows: $H_2S$ (0.85 g), $H_2$ (0.10 g), $Mg_2Al_4Si_5O_{18}$—corderite (4.59 g), CaS (3.15 g), MgS (1.07 g), $NaAlSi_2O_8$—high-albite (0.44 g), $Al_6Si_2O_{13}$—mullite (0.43 g), $KAlSi_2O_6$—leucite (0.24 g) and $TiS_2$ (0.20 g). An assumption was made to include carbon (10 g) since the thermodynamic model takes the process to complete equilibrium, yet it is known in practice that between 10 and 20% of the carbonaceous char is finally combusted during fixed bed gasification (Bunt J. R et al. 2008). An excess of oxygen (50 g) was added to the model input to simulate the effect of oxidation of the CaS species, in particular.

FIG. 5 clearly shows the results of sulphur capturing occurring during the oxidation step; i.e. the CaS is oxidized to insoluble $CaSO_4$ (40%) and corderite reacts with oxygen and sulphur to form $MgSO_4$ (13%) at 925° C. As expected, the gaseous products formed are $SO_2$ and $SO_3$ (47% in total at 925° C.). The $CaSO_4$ distribution remains constant at higher temperatures up to 1225° C. according to the reaction: $CaS+2O_2=CaSO_4$.

This simulated example has shown that 53% of the pyritic sulphur entering the fixed bed gasifier is removed from the gaseous phase as insoluble $CaSO_4$ when operated in a catalytic gasification mode. Whilst the sulphur chemistry may not be novel in terms of this invention, it is argued that this same chemistry still applies to fixed bed gasifiers operating on lump coal (outside of the scope of previous studies), and the chemistry within this new understanding within this application is therefore new.

Enhanced Reactivity Example

In this laboratory study, thermo-gravimetric analyses was conducted to determine the influence of the addition of an alkaline metal catalyst ($K_2CO_3$ in this case, and incorporated into a fine discard coal agglomerate mixture by physical mixing) on the $CO_2$ gasification char reactivity of 10 mm coal pellets subjected at high temperatures (900° C.-1000° C.). Coal samples used in the study included: (1) Discard seam 4 Highveld coal filter-cake with a size of <212 μm, and (2) coarse R.O.M. Highveld seam 4 coal with an average size of 10 mm. Both coal samples were characterised by proximate, ultimate and petrographic analysis using the relevant ISO standards by Advanced Coal Technology Laboratories in Pretoria. The catalyst used in the study is potassium carbonate ($K_2CO_3$, in powder form) with a purity of >99.5%, supplied by Merck (Pty) Ltd. $K_2CO_3$ is a white odourless salt with a melting point of 891° C. The additive was added to the filter cake at dosages of either: 1%, 3% and 5%, and pressed into 10 mm×9 mm pellets using a LRX plus press.

The LRX plus machine is primarily used for material testing. In this study, it was used for the pressing of coal pellets as well as for pellet compressive strength testing. It has a single column with a crosshead travel range of 735 mm (Johnson Scale Co Inc, (Johnson scale Co Inc. 2011)). The software used to analyse data and to control the machine was NEXYGEN PLUS. All pellets required additional water (10%) since it helped to keep the pellet intact when removing it from the die. The samples were prepared in batches of 40 g in order to ensure consistency and homogeneity. The potassium carbonate was ground to the same size as the coal (<212 micron) to ensure homogeneous mixing. The Highveld seam 4 R.O.M. coarse coal sample was screened to extract the naturally fine 10 mm fraction, which was filed (using a metal file), to the same dimensions as the pressed pellets.

The char reactivity experiments were conducted in duplicate on both the pellets and run-of-mine (R.O.M.) coal using a TGA/DSC1 STAR Thermo-gravimetric analyser (TGA.) The machine contains a horizontal furnace which minimizes possible turbulence caused by thermal buoyancy and purge gas. The machine is fully automated and can contain 34 samples (carousel fed) and run 24 hours a day. The sample holders range in volume from 20-900 μl and can test samples 11 mm in diameter. The temperature range of the machine is from 0-1600° C.; each sample was heated at a rate of 10° C./min in nitrogen up to 1000° C. to remove moisture and volatile matter. The char sample was then reacted in $CO_2$ for a maximum of 15 hours (or until completion) at temperatures of 900, 950 and 1000° C. The mass and temperature of the sample was recorded intermittently.

Figure 6A:
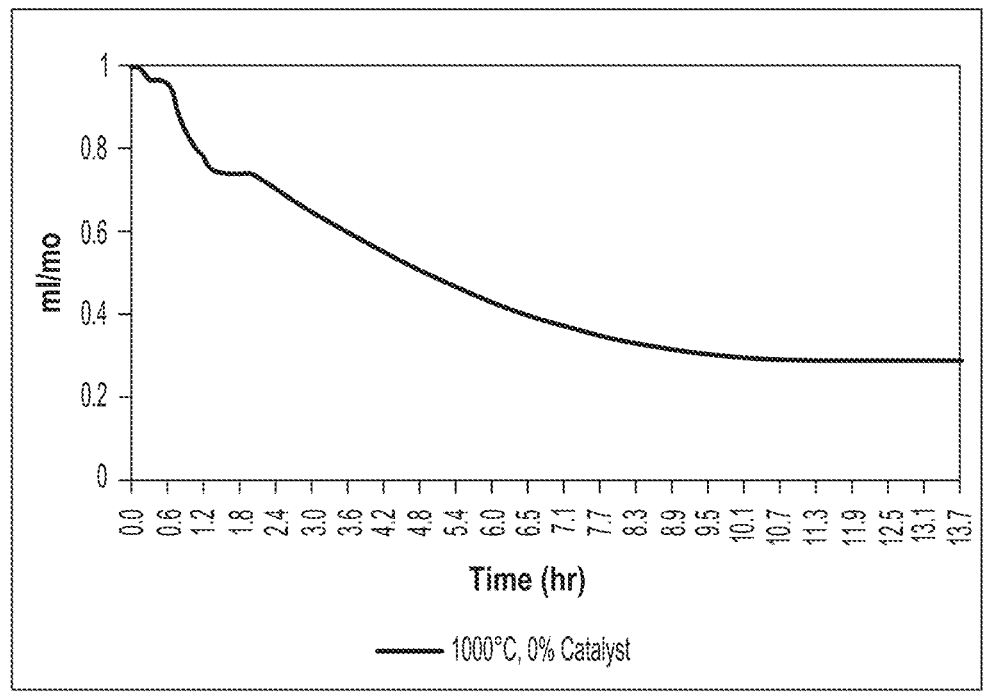
FIG. 6: are graphs showing the effect of catalyst concentration on carbon conversion (900° C. to 1000° C.). 6(a) Mass loss versus time curve obtained for TGA runs (1000° C., 0% catalyst) for the 10 mm filter-cake pellets. 6(b) Conversion versus time curves obtained—duplicate runs at 900° C. (0.5% catalyst addition to pellets) as well as R.O.M. coal. 6(c) Conversion versus time curves obtained at 950° C. (0-5% catalyst addition to pellets) as well as R.O.M. coal. 6(d) Conversion versus time curves obtained at 1000° C. (0.5% catalyst addition to pellets) as well as R.O.M. coal.
Figure 6B:
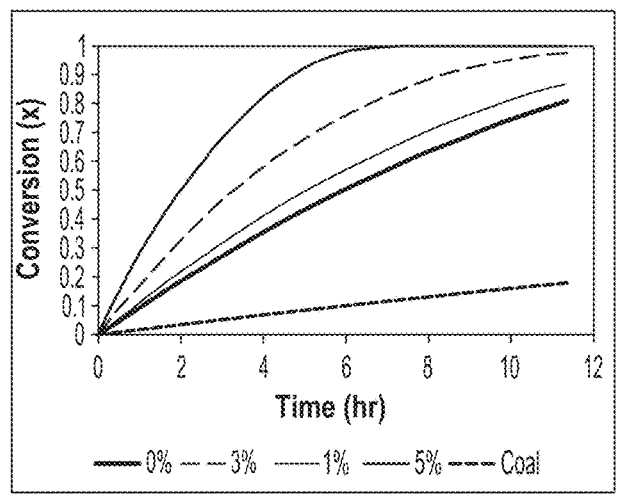

FIG. 6a shows a typical mass loss curve obtained for TGA runs at 1000° C. (no catalyst) for the filter cake pellets. FIG. 6b shows the conversion versus time rate results obtained at 900° C. for the filter-cake pellets (0-5% catalyst addition) as well as for the R.O.M. coal. It can be seen that (at this low temperature) that some of the runs are not all fully completed within the 11 hour test period. In this case, the ash value of 29.4% (obtained from the proximate analysis) was used in the conversion calculation. It can be observed that the 5% addition run reaches full conversion in 6.3 hours, whereas the 0, 1 and 3% additive runs are at a conversion of 80, 86 and 97% respectively after 11 hours. The expected time for full conversion is calculated to be 14.1, 13.2, and 11.7 hours for the 0, 1, and 3% catalyst loaded runs. It is clear from these results that the addition of catalyst decreased the reaction time needed for complete conversion, which is supported by literature for powdered coal research (Suzuki, T et al. 1984; Takaranda, T et al. 1986 and Yuh, S. J et al. 1984). However, the present invention provides the first evidence reported of catalysed large particle ≥10 mm pellet conversion behaviour. These conversion rates are also faster than the rate obtained for the R.O.M. Highveld coal sample (10.6 hours), which possibly indicates that the physical properties (i.e. porosity) may be different for pelletized coal and raw coal, thereby significantly influencing the gasification rate (8.4 hours needed for the raw pellet versus 10.6 hours for the raw R.O.M. coal) (Li, Y et al. 1999). This needs to be further investigated in future studies.

Figure 6C:
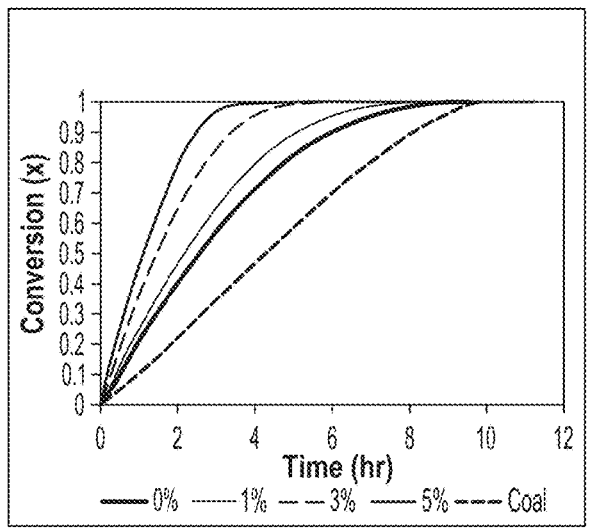
Figure 6D:
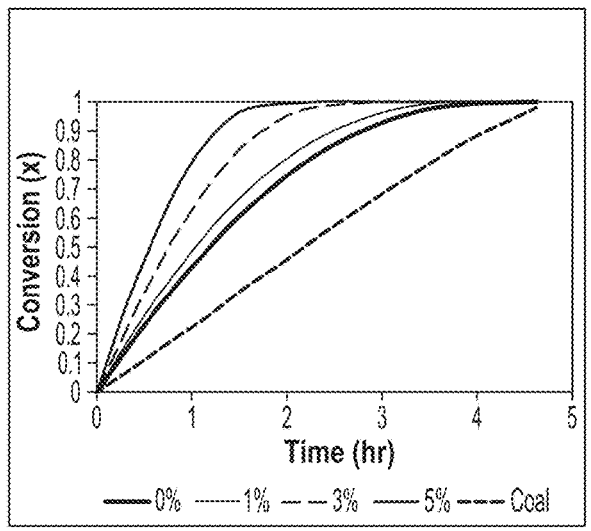
Figure 7A:
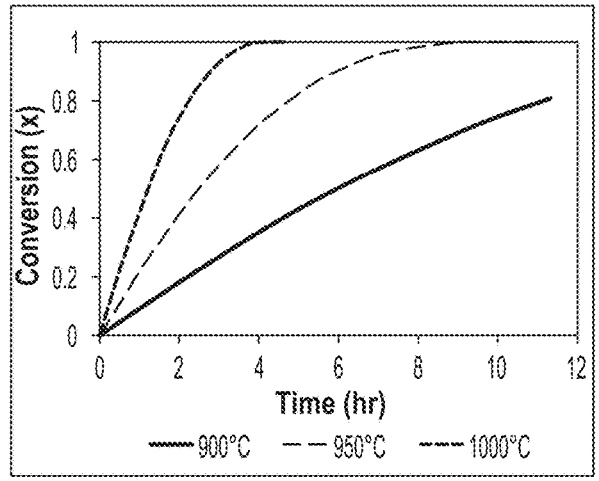
FIG. 7: are conversion versus time graphs highlighting the effect of temperature on the different catalyst additions. 7(a) Conversion versus time (0% catalyst). 7(b) Conversion versus time (1% catalyst). 7(c) Conversion versus time (3% catalyst). 7(d) Conversion versus time (5% catalyst)
Figure 7B:
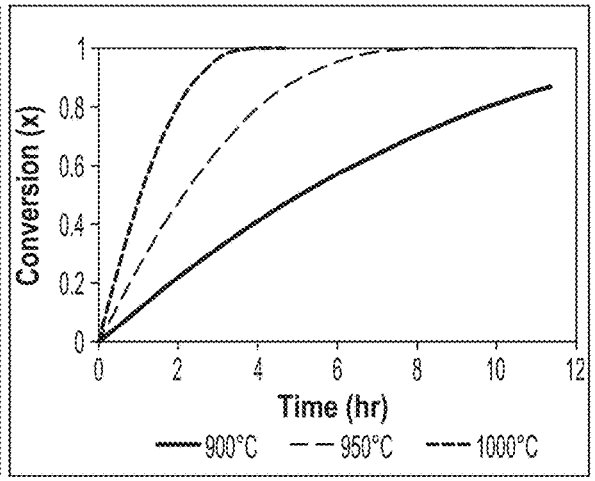
Figure 7C:
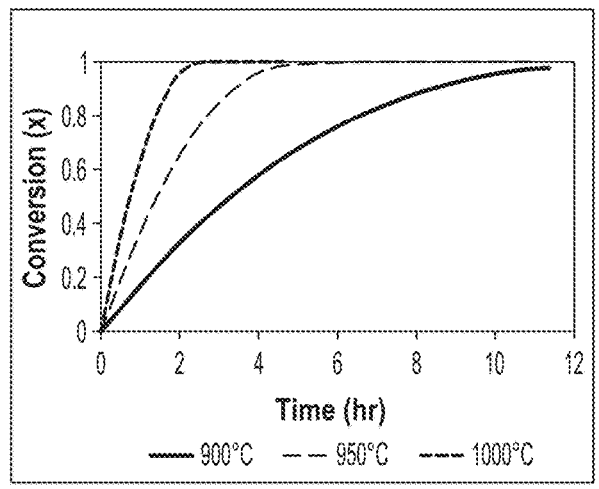
Figure 7D:
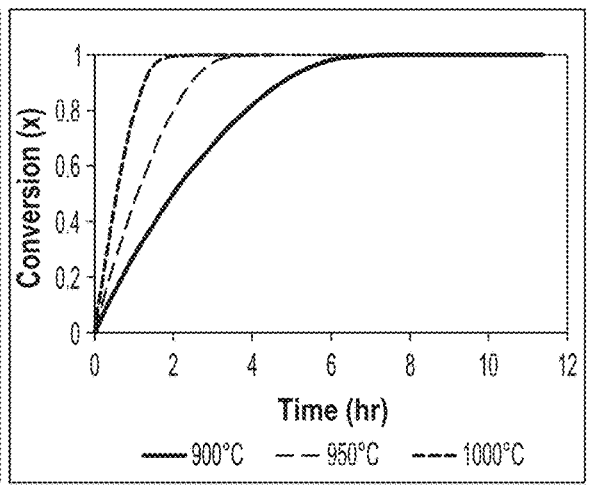
Figure 8:
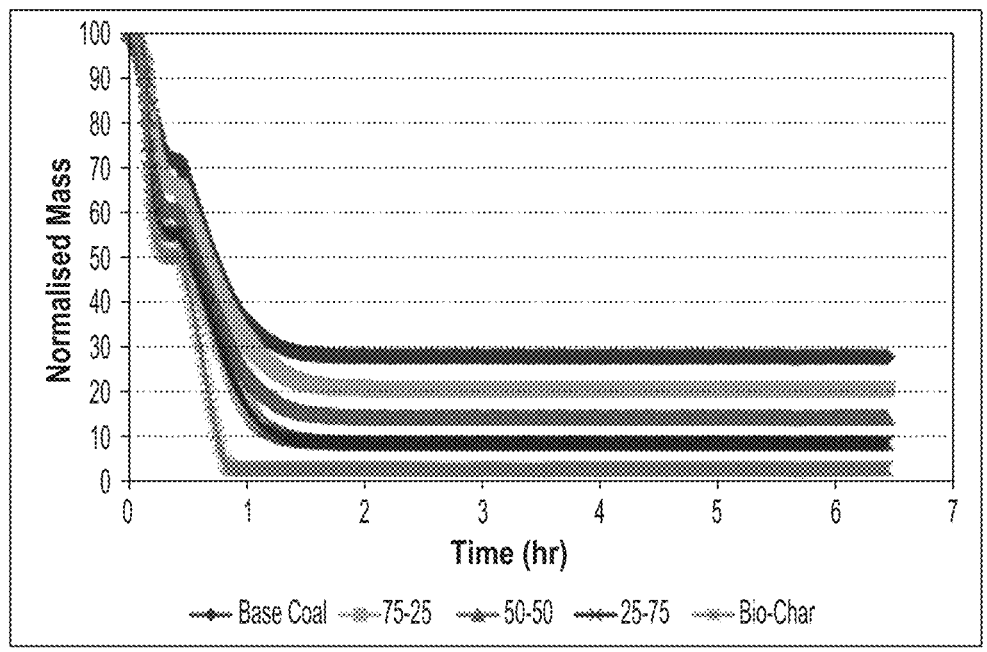
FIG. 8: are graphs showing the normalised mass loss curves for the base coal, bio-char, and the various coal and bio-char blends at 1000° C.

FIG. 6c shows the conversion versus time rate results obtained at 950° C. for the filter-cake pellets (0-5% catalyst addition) as well as for the raw R.O.M. Highveld coal. It can be observed that the 0, 1, 3 and 5% catalyst added pellet runs fully convert at 8.4, 7.2, 4.8 and 3.4 hours respectively. These conversion rates are also faster than the rate obtained for the R.O.M. Highveld coal sample (8.4 hours needed for the raw coal pellets versus 10.6 hour for the raw R.O.M. coal). FIG. 6d shows the conversion versus time rate results obtained at 1000° C. for the filter-cake pellets (0-5% catalyst addition) as well as for the raw ROM Highveld coal. It can be observed that the R.O.M. raw coal required 4.7 hours for complete conversion compared with 3.8 hours needed for the test using pellets containing no catalyst. The reaction time needed for pellet full conversion decreases further with an increase in catalyst loading, i.e. 3.4, 2.4, and 1.9 hours for the 1, 3, and 5% catalyst added runs respectively.

When comparing the results presented in FIGS. 6b-d, it can be seen that the fastest time for completion of conversion is at 1000° C. with 5% catalyst addition. It can also be observed that the biggest differences between the runs occur at low temperature (900° C.). This confirms that added catalyst has the highest influence at low temperatures, in agreement with literature (Li, X T. et at 2009). FIG. 7a-d shows the conversion versus time graphs highlighting the effect of temperature on conversion for the different catalyst additions. It can be observed that an increase in temperature has a positive effect on reaction rate. This effect influences not only the samples containing additional catalyst, but also the 0% added catalyst sample. Evidence of this is also found in the literature where experiments have been conducted on steam gasification (Sharma, A et al. 2008; Eakman, J. M et al. 1980; More, P et at 2012 and Ye, D et al. 1998).

The reaction rates were calculated by using the slope of the conversion versus time graphs, Arrhenius plots where drawn and the activation energy calculated from the slope of the Arrhenius data. Activation energy calculations showed that an increase in catalyst loading decreased the activation energy needed for the reaction, in agreement with literature (Lv, D et al. 2010 and Song, Y et al. 2013). It was found that the activation energy decreases from 190 kJ/mol for the filter-cake pellet (containing no catalyst addition) to 186, 171, 133 kJ/mol for the 1, 3, and 5% cases respectively. There is also a good correlation when comparing the activation energy for the 1% $K_2CO_3$ catalyst addition result (186 kJ/mol) with the work of Nel and co-workers (Nel, S et at 2013 and Nel, S et at 2013).

It was found that the addition of the catalyst additive substantially increased the reaction rate of the conversion. The reaction rate was doubled for the 5% catalyst addition runs compared to the base case (0% catalyst at 900° C.), 120% faster at 950° C. and, 93% faster at 1000° C. The largest effect of catalyst addition was observed at lower temperatures. Temperature influences the reaction rate thereby decreasing the reaction time from 6.36 hours at 900° C. to 3.43 hours at 950° C. and, 1.88 hours at 1000° C. for 5% catalyst addition. The fastest time needed for conversion was with the use of the 5% catalyst addition at 1000° C. which required only 13% of the total time needed for the base case 0% catalyst addition run at 900° C. (14 hours).

These results show that there is indeed an opportunity to improve on the fixed-bed gasifier throughput by speeding up the time needed for the rate limiting $CO_2$ gasification reaction in a catalysed system comprising of fine discard coal agglomerates containing an alkaline additive. The present examples also prove that the addition of a catalyst (1-5% $K_2CO_3$) can be incorporated into a discard coal agglomerate mixture to improve $CO_2$ gasification reactivity of 10 mm pellets measured at high temperatures (900° C.-1000° C.). According to the literature, any of the alkaline and alkaline earth metal catalysts may be applied as catalyst during $CO_2$ gasification (Suzuki, T et al. 1984 and Takaranda., T et al 1986), and dolomite (because of its relative cheapness in comparison with $K_2CO_3$) will be tested in further reactivity studies.

EXPERIMENTAL RESULTS

Example 1

In a first embodiment of the invention, the catalytic effect (enhanced reaction rate) of bio-char on discard Highveld coal during $CO_2$ gasification was investigated. Bio-char was produced using a grade 316 stainless steel autoclave, which was equipped with removable heating jackets and a magnetic stirrer.

Pulverised sweet sorghum bagasse (32.5 g) and distilled water (102 g) were inserted into the autoclave. The autoclave was sealed and air was purged using nitrogen. The two heating jackets were tightened and turned on. The magnetic stirrer was set to 50 rpm and remained constant throughout the run. The temperature was allowed to rise to 290° C. at a heating rate of 2.5 K/min, where after the heating jackets and mechanical stirrer was turned off. The heating jackets were opened and the autoclave was allowed to cool down to atmospheric temperature and pressure. An electric fan was used to accelerate the cooling process.

Chloroform (100 ml) was added to the autoclave after it had reached ambient temperature and was stirred for approximately 10 minutes. Chloroform acts as a solvent and aids in the extraction of liquefaction products. Product separation was achieved using a vacuum filter. The liquid product (a mixture of bio-oil and chloroform) was collected and the bio-char was dried in an oven for 12 hours at a temperature of 105° C. After drying, the bio-char was stored in a zip lock bag. The bio-char was separated into different particle sizes using laboratory sieves. Only particles of a size less than 212 µm were used in this reactivity study.

The discard Highveld coal filter cake was mixed to obtain a homogeneous and representative sample. The coal sample was reduced in size using a ball mill. It was further separated into different particle sizes using laboratory sieves. For this invention, only particles of a size less than 212 µm were used. The proximate analysis results for the discard coal and bio-char are given in Table 1.

TABLE 1

| Proximate analysis results (air dried basis) | | |
|---|---|---|
| Procedure | Coal | Bio-char |
| Moisture content (wt %) | 5.9 | 1.4 |
| Ash content (wt %) | 29.0 | 5.2 |
| Volatile matter (wt %) | 23.5 | 21.9 |
| Fixed carbon (wt %) | 41.5 | 71.4 |

It can be observed that the bio-char has a very low ash content (5.2%) when compared with the discard coal (29%), and the fixed carbon content is high (71.4%) when compared with the discard coal (41.5%).

Blend ratios of coal to bio-char of 75:25, 50:50, and 25:75 were prepared by physically mixing coal and bio-char. $CaCO_3$ was used as catalyst and added to the 75:25 blend in 1 wt %, 3 wt % and 5 wt % concentrations. The samples were then gasified in a TGA with $CO_2$ at temperatures of 900° C., 950° C. and 1000° C., respectively.

The samples placed into the TGA were firstly heated to 30° C. using $N_2$ at a flow rate of 150 ml/min and a heating rate of 50° C./min. This temperature was held constant for 5 minutes. The samples were then pyrolised at 1000° C. for 30 minutes, once again using $N_2$ at a flow rate of 150 ml/min and a heating rate of 50° C./min. The gasification reactions were carried out at 900° C., 950° C., and 1000° C., respectively, using $CO_2$ at a flow rate of 150 ml/min. The reaction time was set to 6 hours.

Figure 9:
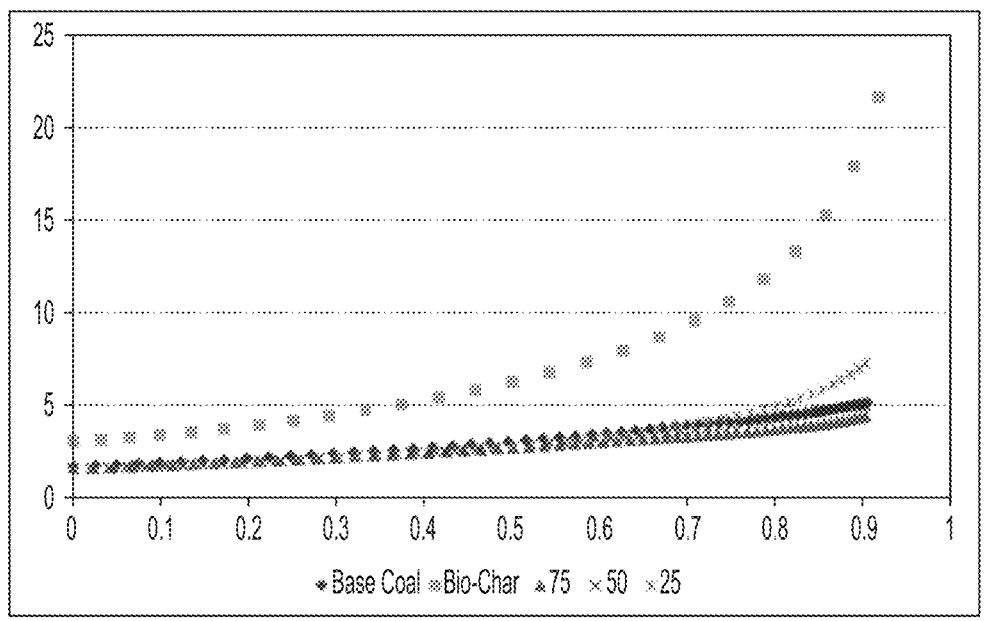
FIG. 9: are graphs depicting the reaction rates of base coal, bio-char and the various blends at 1000° C.

FIG. 9 shows the normalised mass loss curves for the base coal, bio-char, and the various coal and bio-char blends at 1000° C. It can be seen that the ash content of the individual blends decrease as the bio-char loading increases. This serves as evidence that the samples were prepared correctly and accurately according to the specified blend ratios, considering that less ash content is to be expected as the bio-char loading increases. Furthermore, it is clear that the mass loss of bio-char is much faster than that of coal.

To calculate the reaction rate, the moisture content, volatile matter and ash content was removed from the mass loss curve to obtain the carbon mass loss curve. The reaction rate is calculated by using Equation 1.1:

$$r = \frac{dm}{dt}\frac{1}{m_t} \quad \quad 1.1$$

Figure 10:
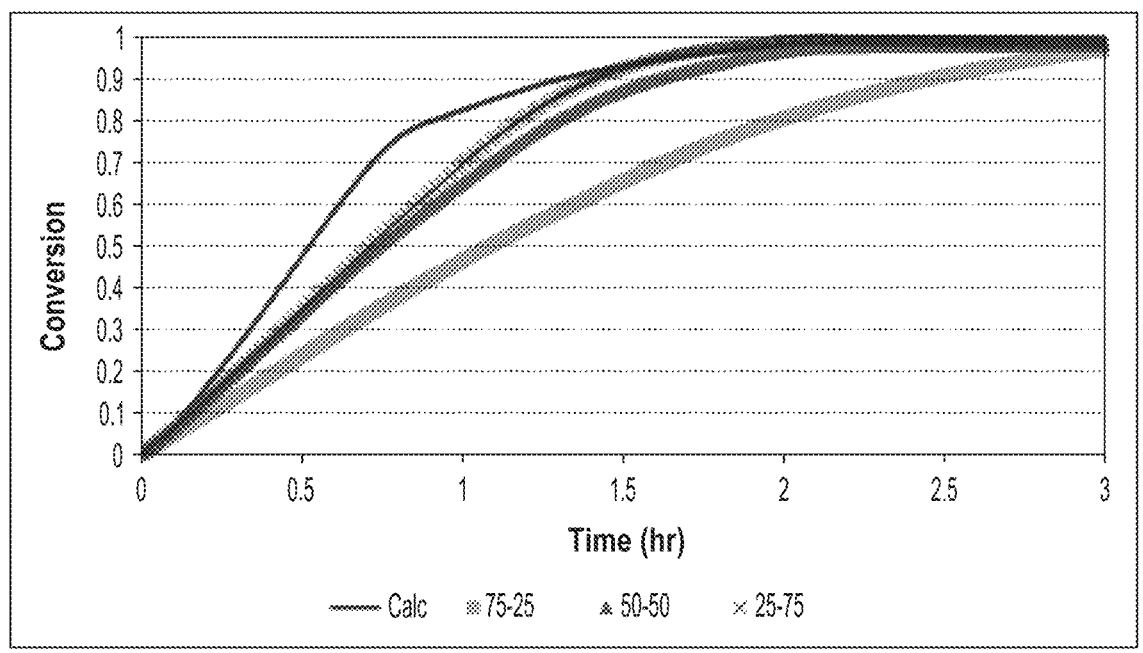
FIG. 10: are graphs showing the theoretical and experimental conversions at 950° C.

Furthermore, the carbon conversion can be calculated by using Equation 1.2:

$$X = \frac{m_i - m_t}{m_i - m_{ash}} \quad \quad 1.2$$

where $m_{ash}$ is the mass of the ash of the respective samples. FIG. 10 shows the reaction rates of base coal, bio-char and the various blends at 1000° C. From FIG. 10, it is apparent that the reaction rate of bio-char is much higher than that of base coal and the individual blends. The high reaction rate of bio-char is a well-known phenomenon and has been studied extensively (Brown et al., 2000:499, Emami-Taba et al., 2013:249, Jeong et al., 2015:465). The reason for this high reaction rate can be attributed to the high alkali metal content of bio-char and weak bonds between holocellulose and lignin (Emami-Taba et al., 2013:250).

Although the reaction rates of the base coal and individual blends are quite similar at the start of gasification, the reaction rate of the 25:75 blend increases significantly at a conversion of 70%, and becomes larger than that of the base coal, the 50:50 blend and the 75:25 blend. It can be seen that the 75:25 blend has the lowest reaction rate at the end of the reaction. At a temperature of 900° C. (not shown here), the difference in the reaction rates were more pronounced, suggesting the catalytic effect is greater at lower temperatures.

Figure 11:
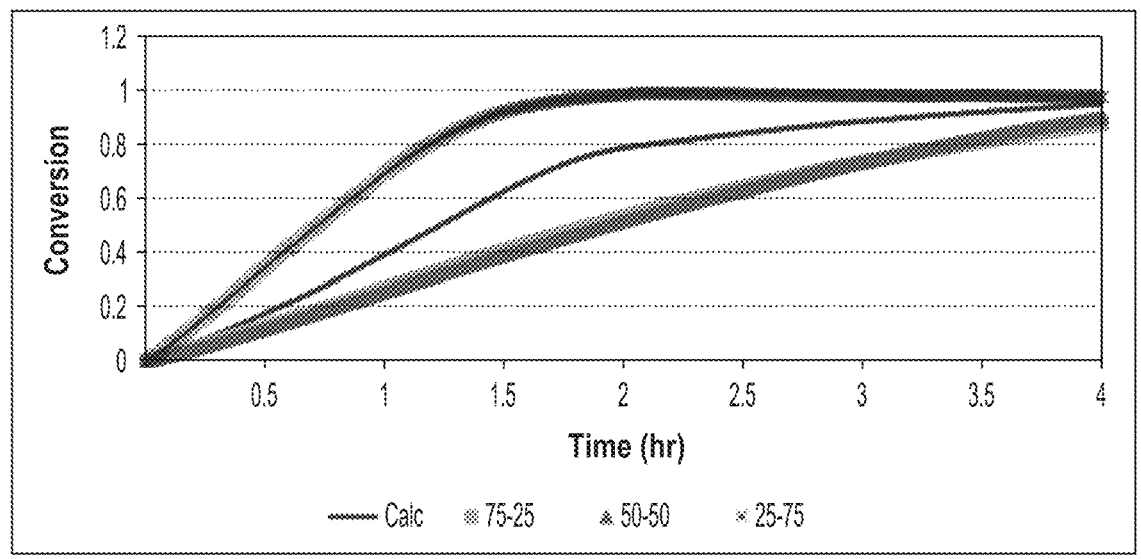
FIG. 11: are graphs presenting the theoretical and experimental conversions at 900° C.
Figure 12:
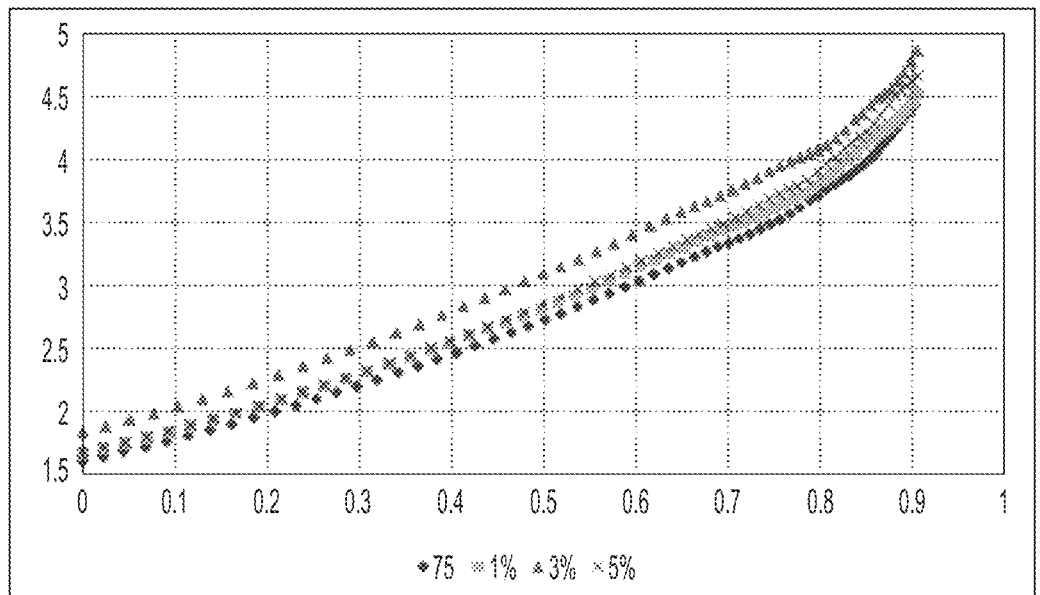
FIG. 12: shows the effect of the addition of $CaCO_3$ on the reaction rate at 1000° C.

To determine if reaction inhibition is present, the theoretical conversion was calculated and compared to the experimental values. To determine the theoretical conversion, the method proposed by Ren et al. (2011:299) was used, as shown in Formula 1.3 directly below.

$$X_{calculated} = \frac{(m_{i,coal} - m_{f,coal})X_{coal} + (m_{i,bio-char} - m_{f,bio-char})X_{bio-char}}{(m_{i,coal} - m_{f,coal}) + (m_{i,bio-char} - m_{f,bio-char})}$$

Where and $X_{coal}$ and $X_{bio-char}$ is the conversion at a time t of the base case sample. If $X_{calculated}$ is larger than the experimental conversion for any blend, reaction inhibition is observed. If $X_{calculated}$ is smaller than the experimental conversion, synergistic effects are present. FIGS. 11 and 12 shows some sample results obtained.

From FIGS. 11 and 12, it can be seen that the theoretical conversion is higher than almost all of the experimental conversions, indicating that reaction inhibition is observed. Only the 25:75 blend at 900° C. (FIG. 12) shows synergistic effects, which once again indicates that a lower temperature might be beneficial to the co-gasification reactions.

A few studies have been conducted to understand the interaction between coal and bio-char and to explain the reaction inhibition. Habibi (2013:70) studied the co-gasification of switchgrass with coal and fluid coke. It was found that inhibition occurs in the co-gasification of switchgrass and coal, which was attributed to alkali metals reacting with aluminosilicates to form immobile compounds, such as $KAlSi_3O_8$ and $KAlSiO_4$. However, synergistic effects were observed between switchgrass and fluid coke, considering the fluid coke contained less mineral matter when compared to coal. Ren et al. (2011:305) co-gasified bone meal and coal and found that at higher temperatures, Ca and Na reacted with mineral matter to form alkali aluminosilicates, thus also inhibiting the reaction. The same inhibiting effects are observed in this study, and is likely caused by the formation of alkali aluminosilicates.

Figure 13:
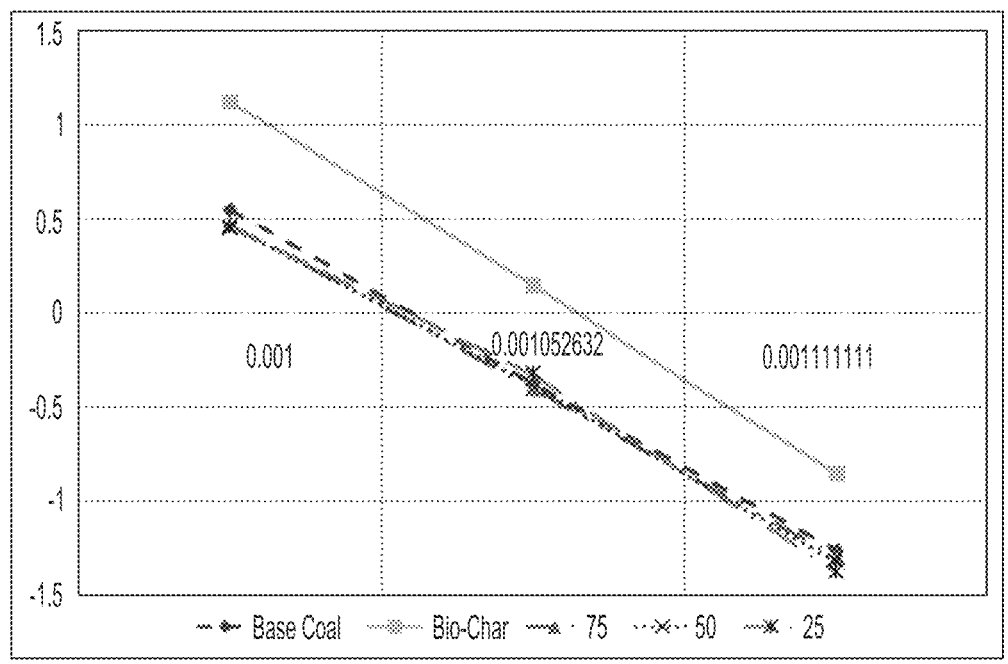
FIG. 13: shows the Arrhenius plots for the base coal, bio-char and respective blends.

To determine the effect of catalyst addition on the reaction rate of coal and bio-char blends, $CaCO_3$ was added to the 75:25 blend in 1 wt %, 3 wt % and 5 wt % concentrations. FIG. 13 shows the effect of the addition of $CaCO_3$ on the reaction rate at 1000° C.

From FIG. 13, it can be seen that the addition of $CaCO_3$ as catalyst increases the reaction rate of the 75:25 blend. The blend containing 1 wt % $CaCO_3$ shows the smallest increase in the reaction rate, while the 3 wt % addition shows the highest increase. Some inhibition is observed when 5 wt % $CaCO_3$ is added, considering the reaction rate is smaller than that of the 3 wt % sample. The optimal catalyst addition seems to be 3 wt %.

The observed activation energy and pre-exponential factor of the Arrhenius equation was calculated by linearization of the Arrhenius equation, as shown in Equation 1.4.

$$\ln r = \ln A - \frac{E}{R}\left(\frac{1}{T}\right) \quad \quad 1.4$$

Figure 14:
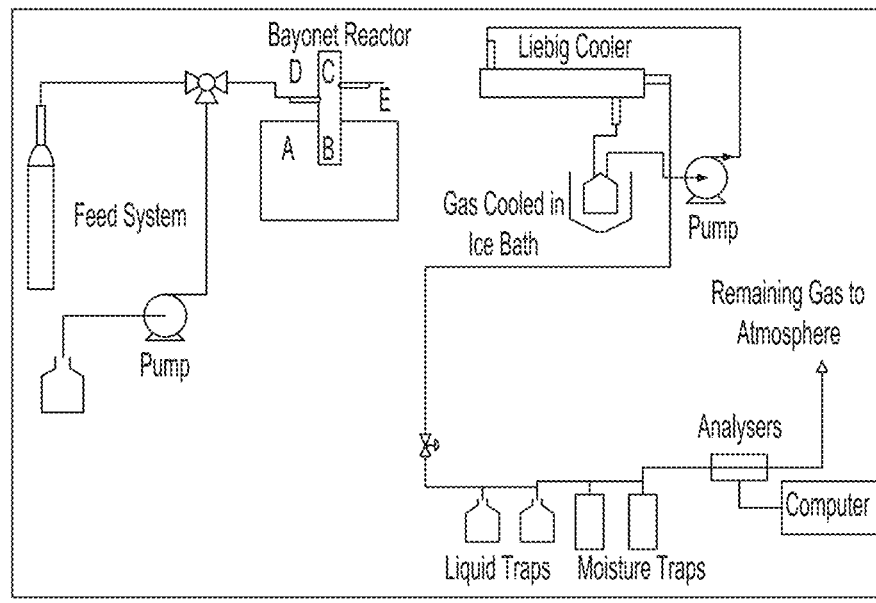
FIG. 14: is an experimental setup of the combustion process used in order to measure retention of sulphur from pellets.

By plotting ln $$r \text{ vs } \frac{1}{T},$$

the linearized Arrhenius plots are obtained. FIG. 14 shows the Arrhenius plots for the base coal, bio-char and respective blends. Table. 2 shows the calculated kinetic parameters.

From the kinetic data is it clear that bio-char had a much higher reaction rate when compared to base coal. As the bio-char loading increased, the reaction rate also increased. However, some reaction inhibition was observed, which could possibly be attributed to the formation of inactive alkali aluminosilicates. Furthermore, the increase in the reaction rate was more pronounced as the temperature decreased.

The activation energies of coal and bio-char were found to be 224 kJ/mol and 242 kJ/mol, respectively. Furthermore, the activation energies of the 75:25, 50:50 and 25:75 blends were found to be 219 kJ/mol, 221 kJ/mol and 227 kJ/mol, respectively. The activation energies of the blends containing 1 wt %, 3 wt % and 5 wt % $CaCO_3$ were found to be 222 kJ/mol, 233 kJ/mol and 222 kJ/mol, respectively.

TABLE 2

Kinetic parameters

| Sample | Activation energy (kJ/mol) | Pre-exponential factor ×10⁵ (1/s) |
|---|---|---|
| Base coal | 224 | 7.02 |
| Bio-char | 244 | 88.39 |
| 75:25 | 219 | 4.04 |
| 50:50 | 221 | 4.88 |
| 25:75 | 227 | 8.91 |
| Blend + 1% $CaCO_3$ | 222 | 5.92 |
| Blend + 3% $CaCO_3$ | 233 | 17.28 |
| Blend + 5% $CaCO_3$ | 222 | 5.59 |

The pre-exponential factor of the Arrhenius equation of base coal was $7.02 \times 10^5$ s$^{-1}$, while the pre-exponential factor for bio-char was $88.39 \times 10^5$ s$^{-1}$. Bio-char's pre-exponential factor is a magnitude larger than base coal's, which signifies the much larger reaction rate of bio-char. As the bio-char loading increased, the pre-exponential factor of the blends also increased. The 75:25 blend has a pre-exponential factor of $4.04 \times 10^5$ s$^{-1}$. The pre-exponential factor of the 50:50 and 25:75 blends were $4.88 \times 10^5$ s$^{-1}$ and $8.91 \times 10^5$ s$^{-1}$, respectively. The blend containing 3 wt % $CaCO_3$ had the highest pre-exponential factor ($17.28 \times 10^5$ s$^{-1}$), while the pre-exponential factors of the 1 wt % and 5 wt % blends were found to be $5.92 \times 10^5$ s$^{-1}$ and $5.59 \times 10^5$ s$^{-1}$, respectively.

The homogeneous model, shrinking core model and Wen's model (not shown here) were all capable of predicting the conversion accurately, considering that no $R^2$ value was found to be lower than 0.94.

Example 2

In a second embodiment of the invention the temperature and catalyst/sorbent effect on the retention of elemental sulphur during combustion of pellets containing coal, bio-char and alkaline earth metal catalyst mixtures were tested. $CaCO_3$ and $Ca(OH)_2$ were the catalysts/sorbents used in this study. Five different pellet variants were tested, i.e. a coal char pellet, a biomass char pellet, a mixture of coal and biomass char, a mixture of coal char, biomass char and $CaCO_3$ and a mixture of coal char, biomass char and $Ca(OH)_2$. The ratio of coal char to biomass char was kept constant at 70:30 for all the mixtures and the (Ca) to (S) ratio was kept constant at 3:1 for both catalysts.

Hydrothermal liquefaction (Example 1) was used to produce biomass char from sweet sorghum bagasse with operating temperatures of 280° C. A total of 140 grams of biomass char was obtained from 300 gram sweet sorghum bagasse. The coal was effectively charred at 950° C., and from the 580 g coal sample a total amount of 450 g of coal char was produced. The proximate analysis of the coal and bio-char can be seen in (Example 1; Table 1). The ultimate analysis of the bio-mass, bio-char and coal/char can be observed in Table 2.

TABLE 3

Ultimate analysis of biomass, biomass char, coal and coal char (air-dried basis %)

Ultimate Analysis on an Air-Dry Basis

| Sample | Total Sulphur (%) | Total Carbon (%) | Hydrogen (%) | Nitrogen (%) | Oxygen (%) |
|---|---|---|---|---|---|
| Biomass (Sweet Sorghum) | 0.35 | 41.5 | 5.33 | 0.14 | 38.71 |
| Biomass Char | 0.2 | 63.6 | 5.09 | 0.14 | 20.15 |
| Coal | 1.0 | 48.5 | 2.75 | 0.4 | 10.11 |
| Coal Char | 1.2 | 55.0 | <0.01 | 0.54 | <0.01 |

It is clear that the sulphur content is lower in the bio-char when compared with the coal/char. Thus in blends of the two, an automatic reduction in feed sulphur to the thermal process is obtained. Pellets were effectively pressed using the LRX machine press. The LRX plus operates with NEXYGEN PLUS software. The power of the machine was set at 4000 kN. Pellets consisting of a 10 mm diameter, a height of 8 mm and a total mass of 450 mg were pressed. Prior to pressing, the sample was crushed by hand to particles smaller than 212 μm. Five different pellet types were pressed in order to meet the aims and objectives:

Plain coal char pellets (CC)
Plain biomass char pellets (BMC)
A mixture of coal and biomass char pellets, containing a ratio of 70 wt % coal char and 30 wt % biomass char (CC+BMC)
A mixture of coal char, biomass char (70 wt % coal char and 30 wt % biomass char) and $CaCO_3$ as catalyst pellets (CC+BMC+CAT1)
A mixture of coal char, biomass char (70 wt % coal char and 30 wt % biomass char) and $Ca(OH)_2$ as catalyst pellets (CC+BMC+CAT2)

Figure 15:
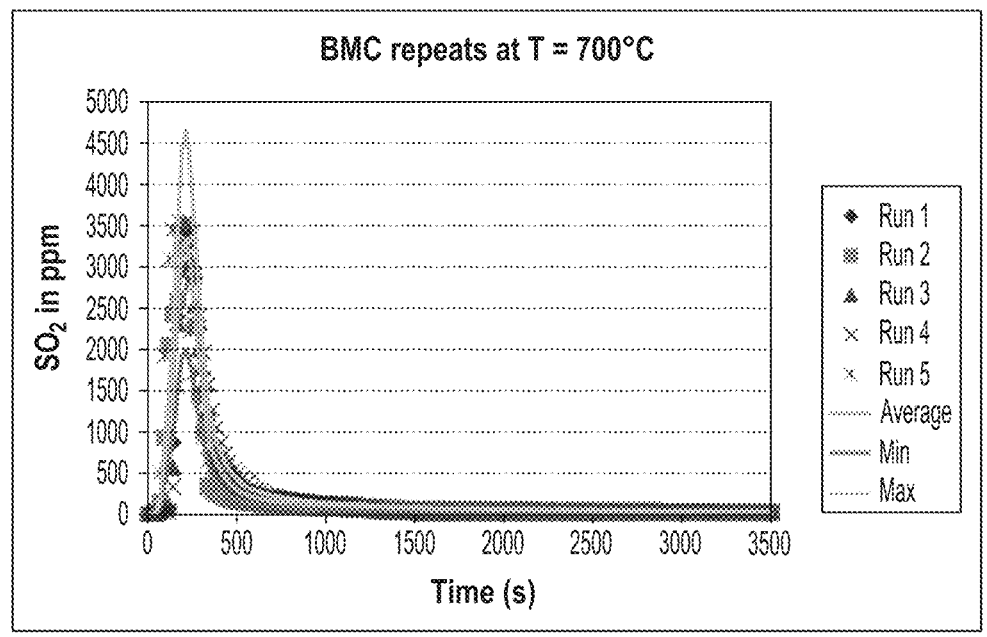
FIG. 15: shows the results obtained during the combustion of biomass char pellets (BMC).

FIG. 15 shows the experimental setup of the combustion process used in order to measure retention of sulphur from the pellets. The combustion setup consisted of a furnace, glass reactor, Liebig cooler, liquid traps and a gas analyser. The furnace of the reactor is represented by the letter A and operates at temperatures between 500° C. and 800° C. The feed, which consists of air, enters the reactor at D at a flow rate of 220 ml/min. The pellets were inserted between two ceramic wool plugs at position B (glass reactor). The letter C indicates a quarts sleeve containing a thermocouple for continuous temperature measurements within the reaction zone. A PID controller was used to maintain a constant temperature. Position E indicates the effluent of the decomposed gases. The gas was then condensed in a Liebig cooler to slow down the flow rate, before passing through liquid and moisture traps where all the remaining moisture was removed.

The $SO_2$ gas was then analysed by a $SO_2$ gas analyser before being vented to atmosphere. $SO_2$ gas is the only gas that can be detected by the gas analyser. To calibrate the $SO_2$ reading, 1% $SO_2$ gas at a flow rate of 220 ml/min, entered through the entire system until the reading reached equilibrium. The analyser was then spanned to zero, so that any increase or decrease of SO₂ could be detected. Before starting the combustion process, all of the SO₂ had to be removed from the system. Nitrogen gas at a high flow rate (420 ml/min) was sent through the system for about 20 minutes to purge all of the SO₂ present.

The glass reactor had to be heated up to a certain desired temperature. The furnace was used to heat up the glass reactor. Both the furnace and the glass reactor contain a thermocouple which controls the temperature. When the desired temperature was reached, it had to be kept constant for the entire combustion process. Normally the glass reactor was approximately 20° C. cooler than the furnace temperature.

After the combustion process, the remaining ash of each sample was analysed. An ICP analyses was conducted to investigate the concentrations of the elements in the sample, as well as to determine the sulphur retention. As an example, FIG. 16 shows the results obtained during the combustion of biomass char pellets (BMC). Each run consisted of 920 mg biomass char pellets and a total of 5 runs were conducted in order to obtain effective repeatability results. The temperature was kept constant at 700° C.

Together with the 5 runs, the average, minimum and maximum data were plotted. The average curve was determined by taking the average data for all five runs. The confidence interval of 95% was calculated and displayed by the minimum and maximum curves. The data points for the five runs are within the minimum and maximum borders and are also gathered around the average curve. The average maximum peak for SO₂ emissions is 3400 ppm which was reached in the first 220 seconds. Each combustion test was completed in approximately 30 minutes.

The SO₂ emission efficiencies for the combustion of biomass char pellets at the above mentioned temperatures were determined using Equation 2.1.

$$S\ \text{retained}(\%) = 1 - \frac{\left(\begin{array}{c}\text{Sulphur before combustion} - \\ \text{Sulphur after combustion(mg)}\end{array}\right)}{\text{Sulphur before combustion(mg)}} \times 100 \quad (2.1)$$

The sulphur before combustion was calculated using the sulphur percentage obtained from the ultimate analysis multiplied by the total mass. The total sulphur after combustion was calculated using the sulphur wt % obtained from the ICP analysis multiplied by the total ash wt %. Table 4 shows the sulphur retention results obtained for the various samples with respect to combustion temperature.

It can be observed that in the case of the BMC pellets, the sulphur retention was found to range between 13% and 18% within the temperature range studied. The coal char (CC) pellets sulphur retention ranged between 16% and 34%; decreasing with increasing temperature. In the case of the mixture of CC+BMC pellets the sulphur retention ranged between 15% and 29%. When the catalyst/sorbent was added (CC+BMC+CAT1), the sulphur retention increased significantly to range between 39% and 78%.

TABLE 4

Sulphur retention as function of reaction temperature for the 5 cases studied

| Type | % S retention (500° C.) | % S retention (600° C.) | % S retention (700° C.) | % S retention (800° C.) |
|---|---|---|---|---|
| BMC | 18 | 13 | 15 | 14 |
| CC | 34 | 22 | 17 | 16 |
| BMC + CC (30:70) | 29 | 19 | 16 | 15 |
| BMC + CC + CAT1 | 60 | 78 | 52 | 39 |
| BMC + CC + CAT2 | 86 | 74 | 67 | 56 |

Finally, when (CC+BMC+CAT2) was combusted, the sulphur retention was found to range between 56% and 86% for the 4 temperatures studied. There is thus clear evidence that catalyst/sorbent addition effectively increased the sulphur retention during the combustion experiments. The Ca(OH)₂ catalyst is the more effective catalyst/sorbent when compared to CaCO₃. The most effective pellet for retaining elemental sulphur was found to be the (biomass char, coal char and Ca(OH)₂) pellet with the highest sulphur retention of 86% at 500° C. The addition of a catalyst/sorbent, especially Ca(OH)₂, tends to minimize the effect of temperature change on the combustion process and also stabilizes the SO₂ emission curves. Without the addition of a catalyst/sorbent the biomass and coal char pellet mixture was found to be the most efficient with a sulphur retention efficiency of only 29% at 500° C. In the case of catalytic gasification, the operating temperature should preferably not exceed 1000° C. It can be concluded from this example shown that a S retention of close to 60% is obtained at a temperature of 800° C. It was also shown in Example 1 (above) that the CO₂ reaction rate (reactivity) is highest at lower operating temperature. Thus it has been proven experimentally that the BM+CC+CAT(1/2) formulation is capable of both (1) enhancing reaction rate during CO₂ gasification, as well as (2) significantly retaining sulphur in the ash during combustion.

As is indeed apparent, significant advantages are associated with the present invention. These include, inter alia, the following.

(1) Post gas clean-up is a highly capital intensive process and the coal feedstock prepared in accordance with the present invention provides an attractive solution to in-situ capturing of sulphur.

By minimizing the amount of sulphur partitioning to the gas phase during utilization lowers the total cost of the gas clean-up process. The present invention has the potential to reduce up to 50% of the current gaseous sulphur emission during fixed bed gasification, with the balance of the sulphur encapsulated in an insoluble solid phase in the ash assemblage. In industrial grate fired boiler applications, where the temperature is kept to below 825° C., the sulphur emission when using the coal feedstock prepared in accordance with the present invention is essentially zero.

(2) Operating costs and gasifier stability are important considerations during fixed-bed gasification, but fixed-bed gasifiers can also be operated in catalytic gasification mode, offering numerous advantages.

Catalytic gasification (using powdered coal and alkaline earth metal catalysts in bench-scale studies) is well known. Advantages proposed include:

(a) Lower reagent consumption (oxygen and steam), due to the lower temperature required in a catalyzed system.

(b) Less problems with ash clinkering and erosion of gasifier internals due to the lower operating temperature utilized (<1000° C. compared with >1250° C.) for the conventional fixed-bed gasification process.
  (c) Enhanced gasification reactivity possible due to catalytic sites and oxygen redox transfer mechanisms at work in a catalyzed system, thus leading to possibilities in enhanced coal throughput due to the positive influence on the reaction kinetics.
  (d) More stable gas composition.

With the addition of the coal feedstock prepared in accordance with the present invention, the catalyst plays a dual role: (1) Self-scrubbing (in-situ capture) of sulphur during utilization in fixed-bed gasification or any process operating on lump coal as well as (2) enhancing the rate limiting $CO_2$ gasification step of the char. The coal feedstock prepared in accordance with the present invention has the capability of at least doubling the gasification reactivity thus allowing for enhanced throughput possibilities in fixed-bed gasifiers.
  (2) $CO_2$ emissions are a growing concern with respect to global warming.

The use of the coal feedstock prepared in accordance with the present invention essentially offers an attractive solution since it is formulated from a combination of discard fine coal and bio-char (a carbonaceous residue after bio-oil extraction). The bio-char addition to the formulation is considered a renewable energy source, thus carbon credits can be claimed due to the reduction in $CO_2$ production.
  (3) Use of the coal feedstock prepared in accordance with the present invention enables the process of catalytic gasification in fixed-bed gasifiers to be employed.

This is now possible since pellet formulation is of lump size (20 mm). Conventional catalytic gasification studies have only focused on powdered coal and not lump coal.
  (4) The bio-char reactivity of the coal feedstock prepared in accordance with the present invention enhances the overall kinetics during utilization, and together with the added catalytic reactivity enhancement offered by the included catalyst, the catalyzed system is rendered more highly reactive.

The co-generation of carbon feed stocks is well known because of the benefits derived in $CO_2$ generation. In most cases the bio-oil will be used as binder if briquetting together with fine coal is being considered. In the case of "green coal", the bio-residue is utilized as a carbon source together with fine discard coal. The bio-char prepared at a temperature of c.a. 300° C. is essentially likened to young lignite in terms of coal rank, and is therefore considered a highly reactive carbon source during utilization.

REFERENCES

Statistics SA. 2011. Mineral accounts for South Africa 1980-2008. Discussion document DO405.2. OCLC Number: 743298325. 63 pages.

White Energy Company. 2012. Annual Report 2012. 88 pages.

Wagner N. J. 2008. The characterisation of weathered discard coals and their behaviour during combustion. Fuel 87: 1687-1697.

Bunt J R and Van Nierop P. 1997. Development of a fine coal circuit for Sasol's Twistdraai Colliery. In Proceedings 13$^{th}$ annual International Pittsburgh Coal Conference; Shanxi, Peoples Republic of China.

UNFCCC. 2001. National Inventory discard and duff coal. Summary Report. cdm.unfccc.int/ . . . /XH3I87ZW2PUQGAJKFY49BCM05TS1R6. 31 pages.

Ratafia-Brown J, Manfredo L, Hoffmann J, Ramezan M. Major environmental aspects of gasification-based power generation technologies. Final report prepared for the USA, DOE. DE-AT26-99FT20101, December 2002.

EUBA. 2007. Densification-related advantages. A Pellet Roadmap for Europe. European Bomass Association. 11 pages.

Radloff B, Kirsten M, Anderson R. 2004. Wallerawang colliery rehabilitation: the coal tailings briquetting process. Minerals Engineering 17 vol. 2: 153-157.

Hippo E. J., Tandon D. 1986. Low temperature steam-coal gasification catalysts. Southern Illinois University. Fuel and Energy Abstracts. Vol. 37 (6), pp. 421(1)

Sharma A, Takanohashi T, Morishita K, Takaranda T, Saito I. 2008. Low temperature catalytic steam gasification of Hyper-Coal to produce $H_2$ and synthesis gas. Fuel 87: 491-497.

Nishiyama Y. 1991. Catalytic gasification of coals—Features and possibilities. Fuel Processing Technology, 29 (1-2): 31-42.

Eakman J. M., Wesselhoft R. D., Dunkleman J. J., Vadovic C. J. 1980. Gasifier operation and modelling in the Exxon Catalytic Coal Gasification Process. Coal Processing Technology, vol. VI. AlChE, New York, pp. 146-158.

Nel S., Neomagus H. W. J. P., Bunt J. R., Everson R. C. 2013. Improved reactivity of large coal particles by $K_2CO_3$ addition during steam gasification. Fuel Processing Technology 114 (2013): 75-80.

Suzuki T, Mishima M, Kitaguchi J, Itoh M, Watanabe Y. 1984. The catalytic steam gasification of one Australian and three Japanese coals using potassium and sodium carbonates. Fuel Processing Technology, 8: 205-212.

Takaranda T, Tamai Y, Tomita A. 1986. Effectiveness of $K_2CO_3$ and Ni as catalysts in steam gasification. Fuel, 65: 679-683.

Skhonde P, Matjie R. H, Bunt J. R, Strydom C. A, Schobert H. H. 2009. Sulphur behaviour in the Sasol-Lurgi Fixed-bed Dry-bottom gasifier. Energy and Fuels, 23: 229-235.

Benson, S. A. Ph.D. Thesis, 1987. Fuel Science, Pennsylvania State University.

J. Abbasian, A. Rehmat, D. Leppin, and D. D. Banerjee, Preprint Papers, Am. Chem. Soc, Div. Fuel Chemistry, 35(1), 196-206 (1990).

Jones, F. L. and Patel; J. G., "Performance of Utah Bituminous Coal in the U-GAS Gasifier." Paper presented at the Fifth EPRI Contractors Conference on Coal Gasification, Palo Alto, Calif., October 1985.

Rehmat, A., Abbasian, M. J., Leppin, D. and Banerjee, D. D., "Reaction of Calcium-Based Sorbents With Sulfur in Coal During Gasification." Paper presented at the International Conference on Coal Science, Eurohal, The Netherlands, 1987.

Chang, E. and Thodos, G., "Complex Nature of the Sulfation Reaction of Limestone and Dolomites," AlChE 3. 30, 3, 1984.

Keairns, D. L., Archer, D. H., Newby, R. A., O'Niell, F. P. and Vidt, E. J., "High Temperature Sulfur Removal System Development Unit," Am. Chem. SOC. Div. Fuel Chem. Prepr. 21, 1976.

Borgwardt, R. H., Roache, N. F. and Brene, K. R. "Surface Area of Calcium Oxide and Kinetics of Calcium-Sulfide Formation," Envir. Proqr. 2, 2 (1984).

Pell, M., "Reaction of Hydrogen Sulfide With Fully Calcined Dolomite. Ph.D. Thesis, City University of New Yock, 1971.

Squires, A. M., Graff, R. A. and Pell, M., "Desulfurization of Fuels With Calcined Dolomites," Chem. Enq. Progr. Symp. Ser. E, 67 (1971).

Freund, M., "Intrinsic Global Rate Constant for the High Temperature Reaction of CaO and HZS," Ind. Eng. Chem. Fund. 23 (1984).

Ruth. L. A., Squires, A. M. and Graff, R. A., "Desulfurization of Fuels With Half Calcined Dolomite," Environ. Sci. Tech., b, 12 (1972).

Kamath. Kamath. V. S. and Petrie, T. W., "Path of Reaction of Hydrogen Sulfide-Carbonyl Sulfide Mixture With Fully Calcined Dolomite," Envir. Sci. Tech., 15, 3 (1981).

Roache. N. F., "Reaction of H2S and Sulfur With Limestone Particles," Ind. Enq. Chem. Process Des. Dev., 23, 1984.

Abbasian, M. J., Rehmat, A., Leppin, D., Banerjee, D. D., "Desulfurization of Fuel Gas With Calcium-Based Sorbents," Fuel Proc. Tech. (to appear March 1990).

Yuh S. J., Wolf E. E. 1984. Kinetic and FT-i.r. studies of the sodium catalysed steam gasification of coal chars. Fuel, 63: 1604-1609.

Wang J, Jiang M, Yao Y, Zhang Y, Cao J. 2009. Steam gasification of coal char catalyzed by $K_2CO_3$ for enhanced production of hydrogen without formation of methane. Fuel, 88: 1572-1579.

Li Y, Lu G. Q., Rudolph V. 1999. Compressibility and fractal dimension of fine coal particles in relation to pore structure characterisation using mercury porosimetry. Particle & Particle Systems Characterization 16: 25-31.

[More P, Jagtap N, Kulal A, Dongare M, Umbarkar S. 2012. Effect of support modification by Magnesia on the low temperature catalytic activity and sulphur tolerance of the $Ag/Al_2O_3$ system. India. AdMet 2012 Paper No. CM 004. 8 pages.

Nel S., Neomagus H. W. J. P., Bunt J. R., Everson R. C. 2013. Improved reactivity of large coal particles by $K_2CO_3$ addition during steam gasification. Fuel Processing Technology 114 (2013): 75-80.

Botha A. 2012. An investigation into fine discard coal agglomeration for use in the fixed-bed gasification process. CEMI479 final year B-Eng research project report.

Usón, S., Valero, A., Correas, L. & Martinez, Á. 2004. Co-Gasification of coal and Biomass in an IGCC Power Plant: Gasifier Modeling. Int. J. Thermodynamics, 7: 165-175.

Zhu, W., Song, W. & Lin, W. 2008. Catalytic gasification of char from co-pyrolysis of coal and biomass. Fuel Processing Technology, 89: 890-896.

Biagini, E., Lippi, F., Petarca, L. & Tognotti, L. 2002. Devolatilisation rate of biomasses and coal-biomass blends; an experimental investigation. Fuel, 81: 1041-1050.

Sonobe, T., Worasuwannarak, N. & Pipatmanomai, S. 2008. Synergies in co-pyrolysis of Thai lignite and corncob. Fuel Processing Technology, 89: 1371-1378.

Ciferno, J. P. & Marano, J. J. 2002. Benchmarking biomass gasification technologies for fuels, chemicals and hydrogen production; US DOE National Energy Technology Laboratory: Pittsburgh, Pa., USA.

Yang, H., Yan, R., Chen, H., Lee, D. H. & Zheng, C. 2007. Characteristics of hemicellulose, cellulose and lignin pyrolysis. Fuel, 86: 1781-1788.

Keown, D. M., Favas, G., Hayashi, J. & Li, C. 2005. Volatilisation of alkali and alkaline earth metallic species during the pyrolysis of biomass: difference between sugar cane bagasse and cane trash, Bioresource Technology, 96: 1570-1577.

Raveendran, K. & Ganesh, A. 1998. Adsorption characteristics and pre-development of biomass pyrolysis char. Fuel, 77: 769-781.

Zolin, A., Jensen, A., Jensen, P. A., Frandsen, F. & Dam-Johansen, K. 2001. The influence of inorganic materials on the thermal deactivation of fuel chars. Energy Fuels, 15: 1110-1122.

Nielsen, H. P., Frandsen, F. J., Dam-Johansen, K. & Baxter, L. L. 2000. The implications of chlorine associated corrosion on the operation of biomass-fired boilers. Progress in Energy and Combustion Science, 26 (3): 283-298.

Collot, A. G., Zhuo, Y., Dugwell, D. R. & Kandiyoti, R. 1999. Co-pyrolysis and co-gasification of coal and biomass in bench scale fixed bed and fluidized bed reactors. Fuel, 78: 667-679.

Moghtaderi, B., Meesri, C. & Wall, T. F. 2004. Pyrolysis Characteristics of Blended Coal and Woody Biomass. Fuel, Vol. 83, No. 6: 745-750.

Kumabe, K., Hanaoka, T., Fujimoto, S., Minowa, T. & Sakanishi, K. 2007. Co-gasification of woody biomass and coal with air and steam. Fuel, 86: 684-689.

De Jong, W., Andries, J. & Hein, R. G. 1999. Coal/biomass co-gasification in a pressurized fluidized bed reactor. Renewable Energy, 16: 1110-1113.

Gray, D., Tomlinson, G. & Berger, M. 1996. Techno-economic assessment of biomass gasification technologies for fuels and power. Produced by The MITRE Corporation for The National Renewable Energy Laboratory, Under Contract No. AL-4159.

Tremel, A., Stemann, J., Herrman, M., Erlach, B., Spliethoff, H. 2012. Entrained flow gasification of biocoal from hydrothermal carbonization. Fuel, 102:396-403

Xie, Q., Borges, F. C., Cheng, Y., Wan, Y., Li, Y., Lin, X., Liu, Y., Hussain, F., Chen, P., Ruan, R. 2014. Fast microwave-assisted catalytic gasification of biomass for syngas production and tar removal. Bioresource Technology, 156:291-296

Kaewpanha, M., Guan, G., Hao, X., Wang, A., Kasai, Y., Kusakabe, K., Abudula, A. 2014. Steam co-gasification of brown seaweed and land-based biomass. Fuel Processing Technology, 120:106-112

Yang, K., Wu, K-T., Hsieh, M-H., Hsu, H-T., Chen, C-S., Chen, H-W. 2013. Co-gasification of woody biomass and microalgae in a fluidized bed. Journal of the Taiwan Institute of Chemical Engineering, 44:1027-1033

Pereira, H. 1998. Variability in the chemical composition of plantation *eucalyptus* (*Eucalyptus globulus* Labill.). Wood Fibre science, 20:2956-2963

Lv, D., Xu, M., Liu, X., Zhan, Z., Li, A. Yao, H. 2010. Effect of cellulose, lignin and alkaline earth metallic species on biomass pyrolysis and gasification. Fuel Processing Technology, 91:903-909 Song, Y., Feng, J., Ji, M., Ding, T., Qin, Y., Li, W. 2013. Impact of biomass on energy and element utilisation efficiency during co-gasification with coal. Fuel Processing Technology, 115:42-49

Anis, S., Zainal, Z. A. 2011 Tar reduction in biomass producer gas via mechanical, catalytic, and thermal methods: a review. Renewable and Sustainable Energy Reviews, 15(5):2355-2377

Li, X. T., Suzuki, K. 2009. Tar properties, analysis, reforming mechanism and model for biomass gasification—an overview. Renewable and Sustainable Energy Reviews, 13(3):594-604

Torres, W., Pansare, S. S., Goodwin, J. G. 2007. Hot gas removal of tars, ammonia and hydrogen sulphide from biomass gasification. Catalytic Reviews: Science and Engineering, 49(4):407-456

Yadav, V., Baruah, B. P., Khare, P. 2013. Comparative study of thermal properties of bio-coal from aromatic spent with low rank sub-bituminous coals. Bioresource Technology, 137:376-385

Chen, P., Min, M., Chen, Y., Wang, L, Li, Y., Chen, Q. 2009. Review of the biological and engineering aspects of algae to fuels approach. International Journal of Agricultural and Biological Engineering, 2(4):1-30

Bridgman, T. G., Jone, J. M., Shield, I., Williams, P. J. 2008. Torrefaction of reed canary grass, wheat straw and willow to enhance solid fuel quantities and combustion properties. Fuel, 87:844-856

Khoo, H. H., Koph, C. Y., Shaik, M. S., Shamatt, P. N. 2013. Bioenergy co-products derived from microalgae biomass via thermochemical conversion—Life cycle energy balance and $CO_2$ emissions. Bioresource Technology, 143: 298-307

Ren, S., Lei, H., Wang, L., Bu, Q., Chen, A., Wu, J., Julson, J., Ruan, R. 2013. The effects of torrefaction on compositions of bio-oil and syngas from biomass pyrolysis by microwave heating. Bioresource Technology, 135:659-664

Piyo, N. 2014. Liquefaction of sunflower husks for biochar production. Masters Dissertation, North-West University (Potchefstroom campus), South Africa Song, Y., Feng, J., Ji, M., Ding, T., Qin, Y., Li, W. 2013. Impact of biomass on energy and element utilisation efficiency during co-gasification with coal. Fuel Processing Technology, 115:42-49

Jiang, L., Hu, S., Xiang, J., Su, S., Sun, L-S., Xu, K., Yao, Y. 2012. Release characteristics of alkali and alkaline earth metallic species during biomass pyrolysis and steam gasification process. Bioresource Technology, 116:278-284

Raveendran, K., Ganesh, A., Khilar, K. C. 1995. Influence of mineral matter on biomass pyrolysis characteristics. *Fuel*, 74:1812-1822

Knudsen, J. N., Jensen, P. A., Dam-Johansen, K. 2004. Transformation and release to the gas phase of Cl, K and S during combustion of annual biomass. Energy Fuels, 18(5):1385-1399

Xiang, F., Li, J. 2012. Experimental study on ash fusion characteristics of biomass. Bioresource Technology, 104: 769-774

Duman, G., Uddin, M. A., Yanik, J. 2014. The effect of char properties on gasification reactivity. Fuel Processing Technology, 118:75-81

Nemanova, V., Abedini, A., Liliedahl, T. Engvall, K. 2014. Co-gasification of petroleum coke and biomass. Fuel, 117:870-875

Fahmi, R. Bridgwater, A. V., Darvell, L I., Jones, J. M., Yates, N., Thomas, S., Donnison, I. S. 2007. The effect of alkali metals on combustion and pyrolysis of *Lolium* and *Festuca* grasses, switchgrass and willow. Fuel, 86:1560-1569

Shi, L., Yu, S., Wang, F-C., Wang, J. 2012. Pyrolytic characteristics of rice straw and its constituents catalyzed by internal alkali and alkali earth metals. Fuel, 96:586-594

Jiang, L., Hu, S., Xiang, J., Su, S., Sun, L-S., Xu, K., Yao, Y. 2012. Release characteristics of alkali and alkaline earth metallic species during biomass pyrolysis and steam gasification process. Bioresource Technology, 116:278-284

Mitsuoka, K., Hayashi, S., Amano, H., Kayahara, K., Sasaoka, E., Uddin, M. A. 2011. Gasification of woody biomass char with CO2: The catalytic effect of K and Ca species on char gasification reactivity. Fuel Processing Technology, 92:26-31

Aho, A., DeMartini, N., Pranovich, A., Krogell, J., Kumar, N., Eränen, K., Holmboom, B., Salmi, T., Hupa, M., Murzin, D. Y. 2013. Pyrolysis of pine and gasification of pine chars—Influence of organically bound metals. Bioresource Technology, 128:22-29

Xue, G., Kwapinska, M., Kwapinski, W., Czajka, L., Kennedy, J., Leahy, J. J. 2014. Impact of torrefaction on properties of Miscanthus×giganteus relevant to gasification. Fuel, 121:189-197

Sawayama, S., Inoue, S., Dote, Y. & Yokoyama, S. 1995. $CO_2$ fixation and oil production through microalga. Energy Conversion Management, 36(6-9): 729-731.

Yang, Y. F., Feng, C. P., Inamori, Y. & Maekawa, T. 2004. Analysis of energy conversion characteristics in liquefaction of algae. Resources, Conservation and Recycling, 43: 21-33

Dote, Y., Sawayama, S., Inoue, S., Minowa, T. & Yokoyama, S. 1994. Recovery of liquid fuel from hydrocarbon-rich microalgae by thermochemical liquefaction. Fuel, 73(12): 1855-1857.

Dote, Y., Inoue, S., Ogi, T. & Yokoyama, S. 1996. Studies on the direct liquefaction of protein-contained biomass: The distribution of nitrogen in the products. Biomass and Bioenergy, 11(6): 491 498.

Bunt J R, Waanders F B. An understanding of the behaviour of a number of element phases impacting on a commercial-scale Sasol-Lurgi FBDB gasifier. Fuel 2008; 87:1751-62.

JOHNSON SCALE CO INC. 2011. Lloyds LRX Plus 5 kN Advanced Universal Testing System.

Suzuki T, Mishima M, Kitaguchi J, Itoh M, Watanabe Y. 1984. The catalytic steam gasification of one Australian and three Japanese coals using potassium and sodium carbonates. Fuel Processing Technology, 8: 205-212.

Takaranda T, Tamai Y, Tomita A. 1986. Effectiveness of $K_2CO_3$ and Ni as catalysts in steam gasification. Fuel, 65: 679-683.

Yuh S. J., Wolf E. E. 1984. Kinetic and FT-i.r. studies of the sodium catalysed steam gasification of coal chars. Fuel, 63: 1604-1609.

Wang J, Jiang M, Yao Y, Zhang Y, Cao J. 2009. Steam gasification of coal char catalyzed by $K_2CO_3$ for enhanced production of hydrogen without formation of methane. Fuel, 88: 1572-1579.

Li Y, Lu G. Q., Rudolph V. 1999. Compressibility and fractal dimension of fine coal particles in relation to pore structure characterisation using mercury porosimetry. Particle & Particle Systems Characterization 16: 25-31.

More P, Jagtap N, Kulal A, Dongare M, Umbarkar S. 2012. Effect of support modification by Magnesia on the low temperature catalytic activity and sulphur tolerance of the $Ag/Al_2O_3$ system. India. AdMet 2012 Paper No. CM 004. 8 pages.

Ye D. P., Agnew J. B., Zhang D. K. 1998. Gasification of a South African low-rank coal with carbon dioxide and steam: kinetics and reactivity studies. Fuel, 77: 1209-1219.

Brown, R. C., Liu, Q. & Norton, G. 2000. Catalytic effects observed during the co-gasification of coal and switchgrass. *Biomass and Bioenergy*, 18:499-506.

Emami-Taba, L., Irfan, M. F., Daud, W. M. A. W., & Chakrabarti, M. H. 2013. Fuel blending effects on the co-gasification of coal and biomass—A review. *Biomass and Bioenergy*, 57:249-263.

Jeong, H. J., Park, S. S. & Hwang, J. 2014. Co-gasification of coal-biomass blended char with $CO_2$ at temperatures of 900-1100° C. *Fuel,* 116:465-470.

Habibi, R. 2013. Co-gasification of biomass and non-biomass feedstocks. Calgary, University of Calgary (PhD thesis).

Ren, H., Zhang, Y., Fang, Y. & Wang, Y. 2011. Co-gasification behaviour of meat and bone meal char and coal char. *Fuel Processing Technology,* 92:298-307.

The invention claimed is:

1. A process for producing a carbonaceous feedstock material from waste-containing carbon sources, the process including the steps consisting of:
   (i) introducing a source of a hydrothermal liquefaction biochar product to a source of discard coal fines to form a bio-coal mixture;
   (ii) introducing a gasification catalyst additive selected from the group consisting of a source of an alkali metal or a source of an alkaline earth metal to the bio-coal mixture;
   (iii) optionally, contacting the bio-coal mixture with a binder; and
   (iv) compacting the resulting mixture of step (ii) or (iii) to form one or more carbonaceous feedstock briquettes, the size of said briquettes having a dimension of at least 5 mm.

2. The process of claim 1, wherein the carbonaceous feedstock briquettes reduces the melting point and increases the efficiency of in-situ sulphur retention of the carbonaceous feedstock material during a gasification process.

3. The process of claim 2, wherein the gasification process is a fixed-bed gasifier, operating in catalytic gasification mode.

4. The process of claim 1, wherein the source of discard coal fines is derived from fines produced during mining and crushing at the mine.

5. The process of claim 4, wherein the source of discard coal fines is selected from the group consisting of one or more of de-watered, filter cake, discard stockpile or slimes dam.

6. The process of claim 1, wherein the source of discard coal fines is derived from fines produced during coal cleaning operations at a coal-preparation plant.

7. The process of claim 1, wherein the source of biochar is prepared from a combination of lignocellulosic biomass and liquid in a standard liquefaction high pressure reactor and dried to form a dried source of biochar.

8. The process of claim 7, wherein the biomass is green or dried raw biomass.

9. The process of claim 8, wherein the biomass is sweet sorghum bagasse.

10. The process of claim 1, wherein the ratio of discard coal fines to biochar varies between 0.1 and 100 wt %.

11. The process of claim 1, wherein the catalyst additive is in the form of an alkali metal or an alkaline earth metal to enhance the reactivity of the resultant carbonaceous feedstock briquettes.

12. The process of claim 11, wherein the catalyst additive is $CaCO_3$ or $Ca(OH)_2$.

13. The process of claim 1, wherein the binder includes one or more of lignin, a lignin and asphalt emulsion, wheat starch, lignosulfonate, tall oil, coal tar, polyvinyl alcohol, phenolic resin, paper sludge, a molasses and lime mixture, gaur gum, polymer material or plastics.

14. The process of claim 13, wherein the amount of binder added is between 1 and 5 wt %.

15. The process of claim 1, wherein the carbonaceous feedstock briquettes have a dimension between at least 5 mm and at least 100 mm.

16. The process of claim 1, wherein water is added in order to promote briquette nucleation.

17. The process of claim 7, wherein the moisture content of the carbonaceous material, lignocellulosic biomass and optional binder being processed into the briquettes is in the order of between 10% and 30%.

* * * * *